United States Patent
Tseng et al.

(10) Patent No.: US 11,304,102 B2
(45) Date of Patent: Apr. 12, 2022

(54) METHOD AND APPARATUS FOR SIDELINK OPERATION

(71) Applicant: Hannibal IP LLC, Frisco, TX (US)

(72) Inventors: Yung-Lan Tseng, Taipei (TW);
Hung-Chen Chen, Taipei (TW);
Mei-Ju Shih, Taipei (TW); Yu-Hsin Cheng, Taipei (TW)

(73) Assignee: Hannibal IP LLC, Frisco, TX (US)

( * ) Notice: Subject to any disclaimer, the term of this patent is extended or adjusted under 35 U.S.C. 154(b) by 0 days.

(21) Appl. No.: 16/931,439

(22) Filed: Jul. 16, 2020

(65) Prior Publication Data

US 2021/0022055 A1 Jan. 21, 2021

Related U.S. Application Data

(60) Provisional application No. 62/874,815, filed on Jul. 16, 2019.

(51) Int. Cl.
| | |
|---|---|
| *H04W 36/00* | (2009.01) |
| *H04W 76/11* | (2018.01) |
| *H04W 72/02* | (2009.01) |
| *H04W 76/27* | (2018.01) |
| *H04W 74/08* | (2009.01) |
| *H04W 24/10* | (2009.01) |
| *H04W 4/40* | (2018.01) |

(Continued)

(52) U.S. Cl.
CPC ..... *H04W 36/00837* (2018.08); *H04L 5/0092* (2013.01); *H04W 4/40* (2018.02); *H04W 24/10* (2013.01); *H04W 36/0094* (2013.01); *H04W 72/02* (2013.01); *H04W 74/0808* (2013.01); *H04W 76/11* (2018.02); *H04W 76/27* (2018.02); *H04W 92/18* (2013.01)

(58) Field of Classification Search
CPC ............... H04L 5/0092; H04W 24/10; H04W 36/00837; H04W 36/0094; H04W 36/03; H04W 36/36; H04W 4/40; H04W 72/02; H04W 74/0808; H04W 76/11; H04W 76/23; H04W 76/27; H04W 92/18
See application file for complete search history.

(56) References Cited

U.S. PATENT DOCUMENTS

2017/0257803 A1* 9/2017 Tenny .................. H04W 36/10
2018/0124656 A1 5/2018 Park et al.
(Continued)

OTHER PUBLICATIONS

Ericsson Sidelink Resource Allocation in V2X 3GPP TSG-RAN WG2 #93-bis Tdoc R2-162818 Apr. 15, 2016(Apr. 15, 2016) the whole document.

(Continued)

*Primary Examiner* — Kashif Siddiqui
(74) *Attorney, Agent, or Firm* — Sul Lee Law Firm PLLC

(57) ABSTRACT

A method for sidelink operation performed by a user equipment (UE) is provided. The method includes receiving, from a first cell, a conditional handover command that includes an indication of a second cell and one or more triggering conditions for handover to the second cell, performing handover to the second cell after determining that at least one of the triggering conditions is fulfilled, and applying a sidelink resource configuration that is stored in the UE after performing handover to the second cell based on the conditional handover command.

24 Claims, 10 Drawing Sheets

(51) Int. Cl.
*H04L 5/00* (2006.01)
*H04W 92/18* (2009.01)

(56) References Cited

U.S. PATENT DOCUMENTS

| | | | | |
|---|---|---|---|---|
| 2018/0279259 | A1* | 9/2018 | Gulati | H04W 4/44 |
| 2018/0279275 | A1* | 9/2018 | Chen | H04W 76/14 |
| 2019/0075447 | A1* | 3/2019 | Lee | H04W 4/40 |
| 2019/0357025 | A1* | 11/2019 | Hwang | H04L 5/001 |
| 2020/0163005 | A1* | 5/2020 | Rao | H04W 4/40 |
| 2021/0045093 | A1* | 2/2021 | Rao | H04W 72/04 |
| 2021/0153176 | A1* | 5/2021 | Lee | H04W 72/14 |
| 2021/0185578 | A1* | 6/2021 | Zhuo | H04W 36/0072 |

OTHER PUBLICATIONS

China Telecom Running CR for introduction of even further mobility enhancement in E-UTRAN 3GPP TSG-RAN WG2 #106 R2-1907137 May 17, 2019(May 17, 2019) section 10.1.2.1a.

Ericsson Resource allocation for Enhanced Mobility 3GPP TSG-RAN WG2 #103-Bis TDoc R2-1815044 Oct. 12, 2018(Oct. 12, 2018) section 1-2.

Zte Considerations on mobility enhancements for V2V 3GPP TSG-RAN WG2 Meeting #94 R2-163820 May 27, 2016(May 27, 2016) the whole document.

* cited by examiner

METHOD AND APPARATUS FOR SIDELINK OPERATION

CROSS-REFERENCE TO RELATED APPLICATION(S)

The present disclosure claims the benefit of and priority of provisional U.S. Patent Application Ser. No. 62/874,815, filed on Jul. 16, 2019, entitled "Exceptional Resource Pools Design for NR V2X Service" ("the '815 provisional"). The disclosure of the '815 provisional is hereby incorporated fully by reference into the present disclosure.

FIELD

The present disclosure is related to wireless communication, and more particularly, to a method for sidelink operation in cellular wireless communication networks.

BACKGROUND

With the tremendous growth in the number of connected devices and the rapid increase in user/network traffic volume, various efforts have been made to improve different aspects of wireless communication for cellular wireless communication systems, such as fifth generation (5G) New Radio (NR), by improving data rate, latency, reliability and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there exists a need for further improvements in the art.

SUMMARY

The present disclosure is related to a method performed by a user equipment (UE) in cellular wireless communication network for sidelink operation.

According to an aspect of the present disclosure, a UE is provided that includes one or more non-transitory computer-readable media containing computer-executable instructions embodied therein and at least one processor coupled to the one or more non-transitory computer-readable media. The at least one processor is configured to execute the computer-executable instructions to receive, from a first cell, a conditional handover command that includes an indication of a second cell and one or more triggering conditions for handover to the second cell, perform handover to the second cell after determining that at least one of the triggering conditions is fulfilled, and apply a sidelink resource configuration that is stored in the UE after performing handover to the second cell based on the conditional handover command.

According to another aspect of the present disclosure, a method for sidelink operation performed by a UE is provided. The method includes receiving, from a first cell, a conditional handover command that includes an indication of a second cell and one or more triggering conditions for handover to the second cell, performing handover to the second cell after determining that at least one of the triggering conditions is fulfilled, and applying a sidelink resource configuration that is stored in the UE after performing handover to the second cell based on the conditional handover command.

BRIEF DESCRIPTION OF THE DRAWINGS

Aspects of the disclosure are best understood from the following detailed description when read with the accompanying drawings. Various features are not drawn to scale. Dimensions of various features may be arbitrarily increased or reduced for clarity of discussion.

DESCRIPTION

Figure 1:
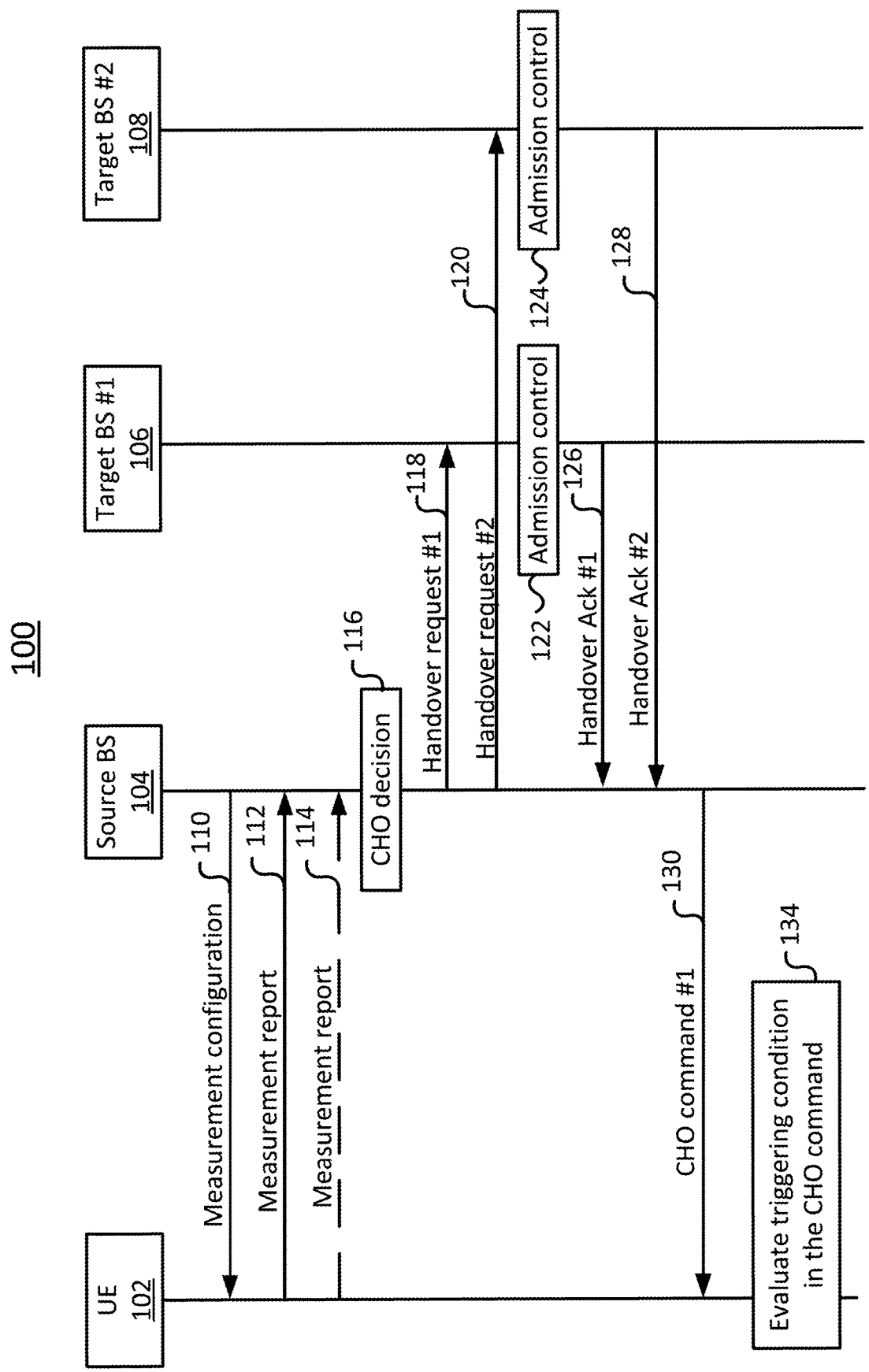
FIG. 1 is a diagram illustrating a conditional handover procedure according to an example implementation of the present disclosure.

The following description contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be differed in other respects and shall not be narrowly confined to what is illustrated in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed description of well-known methods, technologies, systems, and architectures are omitted so as not to obscure the description with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one BS, at least one UE, and one or more optional network elements that provide connection within a network. The UE communicates with the network such as a Core Network (CN), an Evolved Packet Core (EPC) network, an Evolved Universal Terrestrial RAN (E-UTRA), a 5G Core (5GC), or an internet via a RAN established by one or more BSs.

A UE may include but is not limited to a mobile station, a mobile terminal or device, or a user communication radio terminal. The UE may be portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

A BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

A BS may include but is not limited to a node B (NB) in the UMTS, an evolved node B (eNB) in LTE or LTE-A, a radio network controller (RNC) in UMTS, a BS controller (BSC) in the GSM/GERAN, a ng-eNB in an E-UTRA BS in connection with 5GC, a next generation Node B (gNB) in the 5G-RAN, or any other apparatus capable of controlling radio communication and managing radio resources within a cell. The BS may serve one or more UEs via one or more radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the downlink (DL) and optionally uplink (UL) resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or V2X service or sidelink service. Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and UL transmission data should be included in a transmission time interval (TTI) of a single NR frame. The respective portions of the DL transmission data, the guard period, and the UL transmission data should also be configurable based on, for example, the network dynamics of NR. Sidelink resources may also be provided in an NR frame to support ProSe services or V2X services.

In one implementation, a sidelink resource configuration for a UE may include a normal sidelink resource pool configuration and an exceptional sidelink resource pool configuration (also referred to as Exceptional resource pool configuration). Although the Exceptional resource pool configuration is used as an example in following implementations, it should be noted that the method and apparatus for sidelink operation provided in the present disclosure may be also applied to the sidelink resource configuration (e.g., for BS scheduling sidelink grant) or the normal sidelink resource pool configuration (e.g., for UE autonomous sidelink grant selection).

Table 1 lists conditions in which a UE may be allowed to access Exceptional Resource Pools according to LTE/NR V2X protocols. The term "access the Resource Pool" in the present disclosure may refer to "perform sensing on the Resource Pool", "perform Channel Busy Ratio (CBR) measurement or other sidelink measurements (e.g., sidelink Reference Signal Received Power (SL-RSRP), sidelink Reference Signal Received Quality (SL-RSRQ), sidelink Received Signal Strength Indicator (SL-RSSI) and sidelink Signal to Interference plus Noise Ratio(SL-SINR)) on the Resource Pool", "perform packet transmission/reception on the Resource Pool" and "perform sidelink reference signaling transmission/reception on the Resource Pool".

TABLE 1

Triggering Events for LTE/NR V2X UE to access Exceptional Resource Pool(s)

| | |
|---|---|
| Condition #1 Physical Layer Problem (RRC connected UE) | To RRC connected UE & if the UE is configured, by the current serving cell (e.g., Primary Cell (PCell)) with "scheduled", which means the PCell may configure sidelink resource to the UE through Downlink Control Information (DCI). Here, the serving cell may be an NR cell or an E-UTRA cell.<br>(1) UE may trigger a timer (e.g., T310) to count to zero while a physical (PHY) layer problem is detected by the lower layer in the UE side.<br>(2) The PHY layer problem may include that the medium access control (MAC) layer (UE side) receives N310 consecutive out-of-sync indications during a pre-defined timing window, where N310 is a positive integer.<br>(3) UE may be allowed to access Exceptional Resource Pools while T310 is running.<br>The UE may stop T310 after (at least) one of the following conditions occur:<br>1. When the UE receives N311 consecutive in-sync indications from lower layers, where N311 is a positive integer.<br>2. The UE starts to perform a handover procedure or a conditional handover procedure.<br>3. The UE initiates an RRC Connection Re-establishment procedure.<br>4. T310 expiry.<br>In one implementation, one T310 may be configured to the PCell.<br>In one implementation, in NR protocols, two T310 values may be configured for a master cell group (MCG) and a secondary cell group (SCG) respectively. In the present disclosure, T310_mcg and T310_scg may indicate T310 values for MCG and SCG, respectively.<br>In one implementation, the T310_mcg may be triggered upon physical layer problems for the PCell in MCG. Then, T310_mcg may be stopped in following conditions:<br>1. after receiving N311 consecutive in-sync indications from lower layers of the PCell;<br>2. after receiving RRCReconfiguration with reconfigurationWithSync for MCG;<br>3. upon initiating the connection re-establishment procedure;<br>4. upon selection of a suitable NR cell or a cell using another radio access technology (RAT);<br>5. T310_mcg expiry (and so the UE may not reset T310_mcg).<br>In comparison, the T310_scg may be triggered upon physical layer problems for the Primary Secondary Cell (PSCell) in SCG. Then, T310_scg may be stopped in following conditions:<br>1. after receiving N311 consecutive in-sync indications from lower layers of the PSCell;<br>2. after receiving RRCReconfiguration with reconfigurationWithSync for SCG;<br>3. upon initiating the connection re-establishment procedure;<br>4. upon selection of a suitable NR cell or a cell using another RAT;<br>5. T310_scg expiry (and so the UE may not reset T310_scg).<br>6. upon SCG release.<br>In one implementation, while dual connectivity between the UE and the serving RAN is triggered, the usage of Exceptional Resource Pools may depend on the following conditions: |

TABLE 1-continued

Triggering Events for LTE/NR V2X UE to access Exceptional Resource Pool(s)

|  |  |
| --- | --- |
|  | (1) In one implementation, the UE may apply only the UL timing advance (or DL timing) of MCG (e.g., the timing advance configured by the PCell) in sidelink packet transmission. In this condition, the UE may be allowed to access the Exceptional Resource Pools only while the T310_mcg is running. In contrast, the UE may not be allowed to access the Exceptional Resource Pools while only T310_scg is running alone.<br>(2) In one implementation, the UE may apply the UL timing advance (or DL timing) of SCG (e.g., the timing advance configured by the PSCell) in sidelink packet transmission (on all of configured sidelink resource). In this condition, the UE may be allowed to access the Exceptional Resource Pools while the T310_scg is running. In contrast, the UE may not be allowed to access the Exceptional Resource Pools while only T310_mcg is running alone.<br>(3) In one implementation, the UE may apply the UL timing advance (or DL timing) of MCG and SCG on sidelink resource configured with MCG and sidelink resource configured with SCG respectively (In addition, the Exceptional Resource Pool configuration may also be configured on MCG and SCG respectively). In this condition, the UE may be allowed to access the Exceptional Resource Pools of MCG while the T310_mcg is running (In contrast, the UE may not be allowed to access the Exceptional Resource Pools of MCG while only T310_scg is running alone); In comparison, the UE may be allowed to access the Exceptional Resource Pools of SCG while the T310_scg is running (In contrast, the UE may not be allowed to access the Exceptional Resource Pools of SCG while only T310_mcg is running alone). |
| Condition #2<br>RRC Connection<br>Re-establishment<br>Request<br>(RRC connected<br>UE) | To RRC connected UE & if the UE is configured, by the current serving cell (e.g., PCell) with "scheduled", which means the PCell may configure sidelink resource to the UE through DCI.<br>(1) UE may trigger a timer (e.g., T301) to count to zero while the UE sends an RRC Connection Re-establishment REQUEST message to the serving cell.<br>(2) UE may be allowed to access Exceptional Resource Pools while T301 is running.<br>The UE may stop T301 after (at least) one of the following conditions occur:<br>1. When the UE receives RRC Connection Re-establishment message;<br>2. When the UE receives RRC Connection Re-establishment REJECT message;<br>3. When the UE receives RRC(Connection)Setup message (e.g., based on New Radio (Release 15) protocols). It should be noted that this rule may or may not be applied to LTE V2X UE. However, an Exceptional Resource Pool may be configured to an NR UE for LTE V2X service, the RRC(Connection)Setup message transmitted from an NR cell to an NR UE may trigger the NR UE to access LTE Exceptional Resource Pool; In addition, to an E-UTRA UE, an Exceptional Resource Pool may be configured to an E-UTRA UE for NR V2X service, the RRC(Connection)Setup message (e.g., based on E-UTRA (Release 15) protocols) transmitted from an E-UTRA cell to an E-UTRA UE may trigger the E-UTRA UE to access NR Exceptional Resource Pool;<br>4. When the selected cell becomes unsuitable to continue;<br>5. T301 expiry. The UE may transition to an RRC idle state and the UE may not reset T301 after T301 expiry. |
| Condition #3<br>During RRC<br>Connection Re-<br>establishment<br>procedure<br>(RRC connected<br>UE) | To RRC connected UE & if the UE is configured, by the current serving cell (e.g., PCell) with "scheduled", which means the PCell may configure sidelink resource to the UE through DCI.<br>(1) UE may trigger a timer (e.g., T311) to count to zero while the UE initiates RRC Connection Re-establishment procedure.<br>(2) UE may be allowed to access Exceptional Resource Pools while T311 is running.<br>The UE may stop T311 after (at least) one of the following conditions occur:<br>1. The UE selects suitable E-UTRA/NR cell or a cell using another RAT.<br>2. T311 expiry. The UE may transition to an RRC idle state and the UE may not reset T311 after T311 expiry. |

TABLE 1-continued

Triggering Events for LTE/NR V2X UE to access Exceptional Resource Pool(s)

| | |
|---|---|
| Condition #4<br>Handover<br>procedure<br>(RRC connected<br>UE) | To RRC connected UE & if the UE is configured, by the current serving cell (e.g., PCell) with "scheduled", which means the PCell may configure sidelink resource to the UE through DCI.<br>(1) UE may trigger a timer (e.g., T304) to count to zero while the UE receives a handover command from the serving cell (e.g., the serving cell transmits RRC CONNECTION RECONFIGURATION message along with information element (IE) such as "Mobility Control information" or with "reconfiguration with sync").<br>(2) UE may be allowed to access Exceptional Resource Pools while T304 is running.<br>The UE may stop T304 after (at least) one of the following conditions occur:<br>1. Successful completion of handover to another cell. For example, upon successful completion of RA on a corresponding special cell (SpCell);<br>2. T304 expiry. The UE may not reset T304 after T304 expiry.<br>In one implementation, one T304 may be configured to PCell.<br>In one implementation, in NR protocols, T304 may be configured for both MSG and SCG respectively. In the present disclosure, T304_mcg & T304_scg may indicate T304 values for MCG and SCG, respectively.<br>In one implementation, the T304_mcg may be triggered upon reception of RRC Reconfiguration message including reconfigurationWithSync (which may include the value of T304_mcg) and T304_mcg may be stopped upon following conditions:<br>1. upon successful completion of random access on the corresponding PCell;<br>2. T304_mcg expiry (and so the UE may not reset T304_mcg)<br>In comparison, T304_scg may be triggered upon reception of RRC Reconfiguration message including reconfigurationWithSync (which may include the value of T304_scg) and T304_scg may be stopped upon:<br>1. successful completion of random access on the corresponding PSCell.<br>2. T304_scg expiry (and so the UE may not reset T304_scg).<br>(3) In one implementation, the UE may apply only the UL timing advance (or DL timing) of MCG (e.g., the timing advance configured by the PCell) in sidelink packet transmission. In this condition, the UE may be allowed to access the Exceptional Resource Pools only while the T304_mcg is running. In contrast, the UE may not be allowed to access the Exceptional Resource Pools while only T304_scg is running alone.<br>(4) In one implementation, the UE may apply the UL timing advance of SCG (e.g., the timing advance configured by the PSCell) or DL timing in sidelink packet transmission (on all of configured sidelink resource). In this condition, the UE may be allowed to access the Exceptional Resource Pools while the T304_scg is running. In contrast, the UE may not be allowed to access the Exceptional Resource Pools while only T304_mcg is running alone.<br>(5) In one implementation, the UE may apply the UL timing advance (or DL timing) of MCG and SCG on sidelink resource configured with MCG and sidelink resource configured with SCG respectively (In addition, the Exceptional Resource Pool configuration may also be configured on MCG and SCG respectively). In this condition, the UE may be allowed to access the Exceptional Resource Pools of MCG while the T304_mcg is running (In contrast, the UE may not be allowed to access the Exceptional Resource Pools of MCG while only T304_scg is running alone); In comparison, the UE may be allowed to access the Exceptional Resource Pools of SCG while the T304_scg is counting (In contrast, the UE may not be allowed to access the Exceptional Resource Pools of SCG while only T304_mcg is running alone). |
| Condition #5<br>Channel Busy<br>Ratio (CBR) not<br>available<br>(RRC idle/RRC<br>inactive/RRC<br>connected UE) | To RRC idle/inactive/connected UE & if the UE is configured, by the current serving cell (e.g., PCell) with sidelink resource pools.<br>(1) UE may be allowed to access Exceptional Resource Pools while the sensing results to the configured sidelink resource pools are not available. |

TABLE 1-continued

Triggering Events for LTE/NR V2X UE to access Exceptional Resource Pool(s)

Condition #6  To RRC idle UE & if the UE is configured, by the current serving cell
Initial access  (e.g., PCell) with sidelink resource pools.
(RRC idle UE)  (1) UE may be allowed to access Exceptional Resource Pools from the
moment the UE initiates RRC connection establishment until
receiving an RRC(Connection)Reconfiguration including
dedicated sidelink configuration, or until receiving an
RRC(Connection)Release or an RRC(Connection)Reject from the
serving cell.

Also note that,
A. UE may obtain the V2X (or sidelink) Exceptional Resource Pool configurations from
broadcasting system information (SI) or dedicated control signaling from the serving
cell. The SI may include one or more system information blocks (SIB).
   i. In condition #1/condition #3, the UE may access the Exceptional resource pools
provided by V2X-SI (e.g., SIB21/SIB26 in LTE protocols or SIB12/SIB13/SIB14
in NR protocols. In some additional implementations, the V2X-SI may also
include the sidelink related information delivered in other system information
(e.g., SIB1)) and UE specific RRC signaling (e.g.,
RRC(Connection)Reconfiguration message).
   ii. In condition #2/condtion #5/condtion #6, the UE may access the Exceptional
resource pools configured by V2X-SI (e.g., SIB21/SIB26 in LTE protocols or
SIB12/SIB13/SIB14 in NR protocols).
   iii. In condition #4/condition #5, the UE may access the Exceptional resource pools
on UE specific RRC signaling (e.g., through the IE "mobilityControlInfoV2X" or
"reconfigurationwithsync" in RRC(Connection)Reconfiguration message or
through RRC(Connection)Reconfiguration message without
mobilityControlInfoV2X).
The proposed validity area configurations (config. #1~6 in Table 2) may be delivered with
the associated Exceptional Resource Pool configuration. The Exceptional Resource Pool
may also be configured through sidelink pre-configuration. Therefore, the proposed validity
area configurations may also be configured with the associated Exceptional Resource Pool
configuration by sidelink pre-configuration. The sidelink pre-configuration may include
configurations for NR PC5 interface and/or LTE PC5 interface.
B. (LTE) V2X service supports multiple sidelink carrier operation to one UE. The serving
cell of the UE, such as PCell, may configure Exceptional Resource Pools configuration
on the operating frequency of serving cell and/or the Exceptional Resource Pools on
other sidelink frequency carriers (e.g., other sidelink frequency carriers may be
indicated in v2x-InterFreqInfoList in the RRC(Connection)Reconfiguration message).
In one implementation, the UE may access the Exceptional Resource Pools configured
by the PCell in which the UE detects PHY layer problem or radio link failure event in
the (LTE/NR) Uu interface. For example, the UE may apply the Exceptional Resource
Pools configuration when performing a conditional handover procedure and radio link
failure occurs. The PCell may configure the Exceptional pool through broadcasting
system information or dedicated control signaling (e.g., the dedicated
RRC(Connection)Re-configuration message to the UE). It should be noted that NR V2X
service (may be also referred to as NR sidelink service) may also support multiple
sidelink carrier operation by taking LTE V2X multiple sidelink carrier operation as the
baseline.
C. NR V2X may support Sidelink Bandwidth Part (SL-BWP) design. At UE side, one (or
more than one) sidelink BWP may be configured in each sidelink frequency carrier. To
one UE, each sidelink BWP may be associated with different numerologies (e.g.,
subcarrier spacing, cyclic prefix length, search space configuration) for UE to
transmit/receive sidelink packets or to implement sidelink measurement/sensing. Each
sidelink BWP may be further configured with one (or more than one) Exceptional
Resource Pool(s). In one implementation, each of the normal sidelink resource pool
configuration and the exceptional sidelink resource pool configuration may be
associated with one sidelink BWP in one sidelink component carrier.
D. Implementations in Table 1 may be applied to an intra-RAT scenario. In one
implementation, a UE is served by an LTE serving cell and the LTE serving cell
configures Exceptional Resource Pool configuration of LTE V2X service to the UE. The
UE may apply the rules in Table 1 based on the LTE protocols (e.g., based on the 3GPP
specification TS 36.321/TS 36.331). In one implementation, a UE is served by an NR
serving Cell and the NR serving cell configures Exceptional Resource Pool
configuration of NR V2X service to the UE. The UE may apply the rules in Table 1
based on the NR protocols (e.g., based on the 3GPP specification TS 38.321/TS
38.331)). In one implementation, both the NR protocols and LTE protocols may be
considered jointly.
E. Implementations in Table 1 may also be applied to an inter-RAT scenario. In one
implementation, the operation of the timers and the control signaling in Table 1 may be
configured based on NR protocols (e.g., based on the 3GPP specification TS 38.321/TS
38.331) to trigger a UE to access Exceptional Resource Pools configuration of LTE V2X
service. For example, the (NR) UE may be served by a serving NR cell and the serving
NR cell may also configure Exceptional Resource Pools configuration of LTE V2X
service to the UE. In one implementation, the operation of the timers and the control
signaling in Table 1 may be configured based on LTE protocols (e.g., based on the 3GPP
specification TS 36.321/TS 36.331) to trigger a (E-UTRA) UE to access Exceptional
Resource Pools configuration of NR V2X service. For example, the UE may be served
by a serving LTE cell and the serving LTE cell may also configure Exceptional Resource
Pools configuration of NR V2X service to the UE.

TABLE 1-continued

Triggering Events for LTE/NR V2X UE to access Exceptional Resource Pool(s)

F. In one implementation, the Exceptional Resource Pools configuration may be provided based on sidelink pre-configuration. The UE may obtain sidelink pre-configuration from (1) memory module of the UE itself; (2) UMTS Subscriber Identity Module (USIM) of the UE itself; or (3) stored information configured from upper layer (e.g., V2X application layer) while the UE has connected in previous time. In addition, the sidelink pre-configuration may cover the pre-configuration for the LTE V2X service and/or NR sidelink pre-configuration.

In one implementation, one Exceptional Resource Pool may include a combination of continuous (or discontinuous) physical resource blocks (PRB), where each physical resource block occupies one or more than one symbol(s) in time domain and one or more than one sub-carrier(s) in frequency domain. In addition, periodicity of one Exceptional Resource Pool may also be configured to the UE, and thus the UE may know when the Exceptional Resource Pool(s) may be allocated by the serving RAN periodically.

The serving RAN may be composed by one or more than one BS to serve at least one user equipment (UE). One UE may have one RRC connection associated with one (or more than one) serving cell, which is a logical entity created by one BS based on specific Radio Access Technology (e.g., New Radio, UTRA, E-UTRA). Moreover, each cell may be realized based on different configurations in the Layer-1 (e.g., physical layer parameters, such as operating frequency carrier, bandwidth, subcarrier spacing (SCS), numerology, cyclic prefix length) and Layer-2 (e.g., Medium Access Control (MAC) parameters, Radio Link Control (RLC) parameters, Packet Data Convergence Protocol (PDCP) parameters, Service Data Adaptation Protocol (SDAP) parameters).

In NR V2X service (or NR sidelink service), new factors are considered: (1) NR V2X service (or NR sidelink service) may also support LTE V2X service. Both of NR Exceptional Resource Pools (configured by NR gNB or LTE eNB) and LTE Exceptional Resource Pools (configured by NR gNB or LTE eNB) may need to be configured in system information and dedicated control signaling. (2) Area-based Exceptional Resource Pools configuration. In one implementation, Mode 2 resource configuration may be provided for a given validity area where UE does not need to acquire a new Mode 2 resource configuration while moving within the validity area, at least when this configuration is provided by SIB (e.g., reuse valid area of NR SIB).

In one implementation, the sidelink resource configuration, which may include a normal resource pool configuration and an exceptional resource pool configuration, may be valid within a validity area.

Implementations in the present disclosure include:
(1) Area-based Exceptional Resource Pools It should be noted the validity area in the present disclosure may not be limited to 'Mode 2 resource pools' or 'Exceptional Resource Pools'. The validity area may be also applied to other V2X configurations.

(2) Valid RRC states for the (area-based) Exceptional Resource Pool

One UE may transition between different RRC states while the UE is still in the validity area of one Exceptional Resource Pool. Implementations are provided below to address whether or not a UE may access the stored Exceptional Resource Pool(s) after RRC state transition. The RRC state, including RRC connected/inactive/idle state, of the UE is taken into consideration. Implementations are provided below to address how the UE may access the area-based Exceptional Resource Pool(s) during the handover procedure. Moreover, the conditional handover (CHO) procedure is also taken into consideration.

It should be noted that the Exceptional Resource Pool configuration is taken as an example in following implementations. However, the implementations may be also applicable to the normal (area-based) sidelink resource pool configuration, the sidelink resource configuration, and/or other configurations for (LTE/NR) V2X services.

In one implementation, a CHO command may include at least one of the following: a triggering condition, a leaving condition, a target cell identifier (ID), a carrier frequency (e.g., NR-Absolute Radio Frequency Channel Number (ARFCN)) of the target cell, a life time of the CHO, a handover priority (e.g., HO priority, or CHO command priority), a CHO command ID, dedicated Random Access Channel (RACH) configuration(s), and common RACH configuration(s) (e.g., for optionally providing resources for a contention-free random access).

In one implementation, a CHO command may include more than one target cells (e.g., candidate target cells). In one implementation, a target cell of a CHO command may be configured with a cell priority and/or access control (AC) parameter (e.g., AC barring factor). In one implementation, a target cell of a CHO command without a cell priority may be pre-configured with a default cell priority (e.g., being pre-defined in the technical specification).

FIG. 1 is a diagram illustrating a conditional handover procedure 100 according to an example implementation of the present disclosure. The source BS 104, the target BS #1 106, and the target BS #2 108 may be next generation NodeBs (gNBs), or any combination of other types of BSs. For example, any of the source BS 104, the target BS #1 106, and the target BS #2 108 may be an evolved NodeB (eNB) in some implementations. In one implementation, the source BS 104 may be an eNB, while the target BS #1 106 may be a gNB (or an eNB) and the target BS #2 108 may be an eNB (or a gNB). In one implementation, the source BS 104 may be a gNB, while the target BS #1 106 may be an eNB (or a gNB) and the target BS #2 108 may be a gNB (or an eNB).

In action 110, source BS 104 may provide measurement configurations to UE 102, where the measurement configurations may include threshold(s) to trigger early measurement reports for determining potential target cell(s) for a handover. For example, the threshold(s) may include a lower threshold for neighboring cells and/or a higher threshold for the serving cell for a measurement event which may trigger the measurement report(s). For example, a UE may be triggered to provide measurement report to the serving cell (or serving BS) while the Event A3 (one neighbor cell becomes offset better than the special cell, such as PCell or PSCell) or Event A5 (the special cell becomes worse than one given threshold and one neighbor cell becomes better than another given threshold) is fulfilled. The thresholds and offsets of different triggering events may also be configured by the serving cell.

In action 112, UE 102 may send a measurement report(s) to source BS 104 when a measurement event criterion (such as the Event A3/A5 and other events defined in the 3GPP TS 38.331 or TS 36.331) is met. In action 114, UE 102 may send another measurement report(s) to source BS 104 when another measurement event criterion is met, for example, when another event is triggered by a higher threshold set for the serving cell or PCell (e.g., when the serving cell quality drops lower than a preconfigured threshold or when the PCell quality drops lower than a preconfigured threshold).

In action 116, after receiving the measurement reports from UE 102, source BS 104 may make a CHO decision. Thereafter source BS 104 may send a corresponding Handover Request message to each of the potential target BSs. Source BS 104 may send Handover Request message #1 to target BS #1 106 in action 118. Source BS 104 may also send Handover Request message #2 to target BS #2 108 in action 120.

In actions 122 and 124, target BS #1 106 and target BS #2 108, respectively, may perform admission control procedures. Thereafter, in action 126, target BS #1 106 may send Handover Acknowledgement (Ack) message #1 to source BS 104 when target BS #1 106 accepts the handover request from source BS 104. Similarly, in action 128, target BS #2 108 may send Handover Ack message #2 to source BS 104 when target BS #2 108 accepts the handover request from source BS 104. Thereafter, source BS 104 may send CHO command #1 (or CHO configuration) to UE 102 in action 130 in response to both Handover Ack message #1 and Handover Ack message #2. The CHO command #1 in action 130 may include at least one candidate target BSs (e.g., the target BS #1 106 and target BS #2 108) and at least one triggering condition (e.g., one triggering condition may be shared by both of the target BSs or each target BS may be associated with one triggering condition and the triggering conditions of different target BSs may be independent) for a CHO procedure.

A CHO command may contain more than one target cell(s) with the same triggering condition(s), where each target cell may be generated and maintained by one of the target BSs. As described in 3GPP specification (e.g., TS 36.300 and TS 38.300), one cell is a logical entity as a combination of DL and optionally UL resources operating in one specific frequency carrier. The UE can detect and identify one cell by monitoring the synchronization signals (e.g., synchronization signal block (SSB)) and system information broadcasted by one BS (e.g., the source BS 104, target BS #1 106 and target BS #2 108). The linking between the carrier frequency of the DL resources and the carrier frequency of the UL resources may also be indicated in the system information transmitted on the DL resources. Therefore, in FIG. 1, the UE 102 is connected with the source BS 104 with (at least) one associated serving cell. Then, the UE may also be triggered to handover to one target cell of the target BS #1 106 or target BS #2 108 by monitoring one (or more than one) candidate target cell(s) associated with the target BS #1 106 or target BS #2 108. Please also note, in some implementations, from the UE side, the target entity of measurement configurations and CHO command may be cells, rather than BSs. For examples, these provided configurations may be associated with cellidentity and/or Physical cell identity (PCI), which may be broadcasted by the BSs in the system information and SSB respectively. Therefore, the UE could identify each cell by detecting the cellidentity and PCI in the air link.

In one implementation, sidelink resource configurations associated with the candidate target cells (of the target BS #1 106 and target BS #2 108) may also be included in the CHO command #1. The source BS 104 may negotiate with the target BS #1 106 and the target BS #2 108 during the actions 118, 120, 126 and 128 for sidelink resource configuration. In the CHO command #1, one candidate target cell may be configured to be associated with one sidelink resource configuration. Moreover, while one candidate target cell is selected by the UE 102 as the target cell for handover (e.g., while the Event A3/A5 configured to be associated with the candidate target cell is met), the UE may also start to implement sidelink operation by accessing the sidelink resource configuration associated with the selected target cell.

A CHO command may only include one target cell. Whether more than one target cell is included in a CHO command may depend on network (NW) decision. A UE may store more than one CHO command associated to the target cells of the same BS or the target cells of different BSs. A UE may receive a first CHO command and then may receive a second CHO command from the source BS 104. For example, the source BS 104 may receive measurement results associated to cells belonging to different BS. Then, the source BS 104 may send CHO command request to different BSs. In one implementation, after sending a CHO command #1 to the UE 102, the source BS 104 may send another CHO command #2. The source BS 104 may add/remove/modify/suspend the target cell and corresponding trigger conditions/parameters indicated in the CHO command #1 to form the CHO command #2. The CHO command #2 may include an information field that indicates the action performed (e.g., add/remove). In some additional implementations, the UE may replace the stored CHO command #1 by storing the newly received CHO command#2. The stored CHO command #1 may be released directly after the new CHO command #2 is received. Please also note, the previously mentioned procedure with respect to CHO command add/remove/modify/suspend/replace may also be applicable to an update of the sidelink resource configurations in the CHO command.

After receiving the CHO command message(s), in action 134, UE 102 may start evaluating the triggering condition(s) to determine whether a triggering condition(s) for the CHO command message(s) is met, while continuing operating in its current RRC configuration. When UE 102 determines that (at least) a triggering condition is fulfilled, UE 102 may access the corresponding CHO command to connect to the target cell (e.g., to target BS #1 106 or target BS #2 108).

Case 1: Area-based Exceptional Resource Pools Design

In one implementation, the Exceptional resource pools (or the sidelink resource configuration) may be valid in a validity area.

Figure 2:
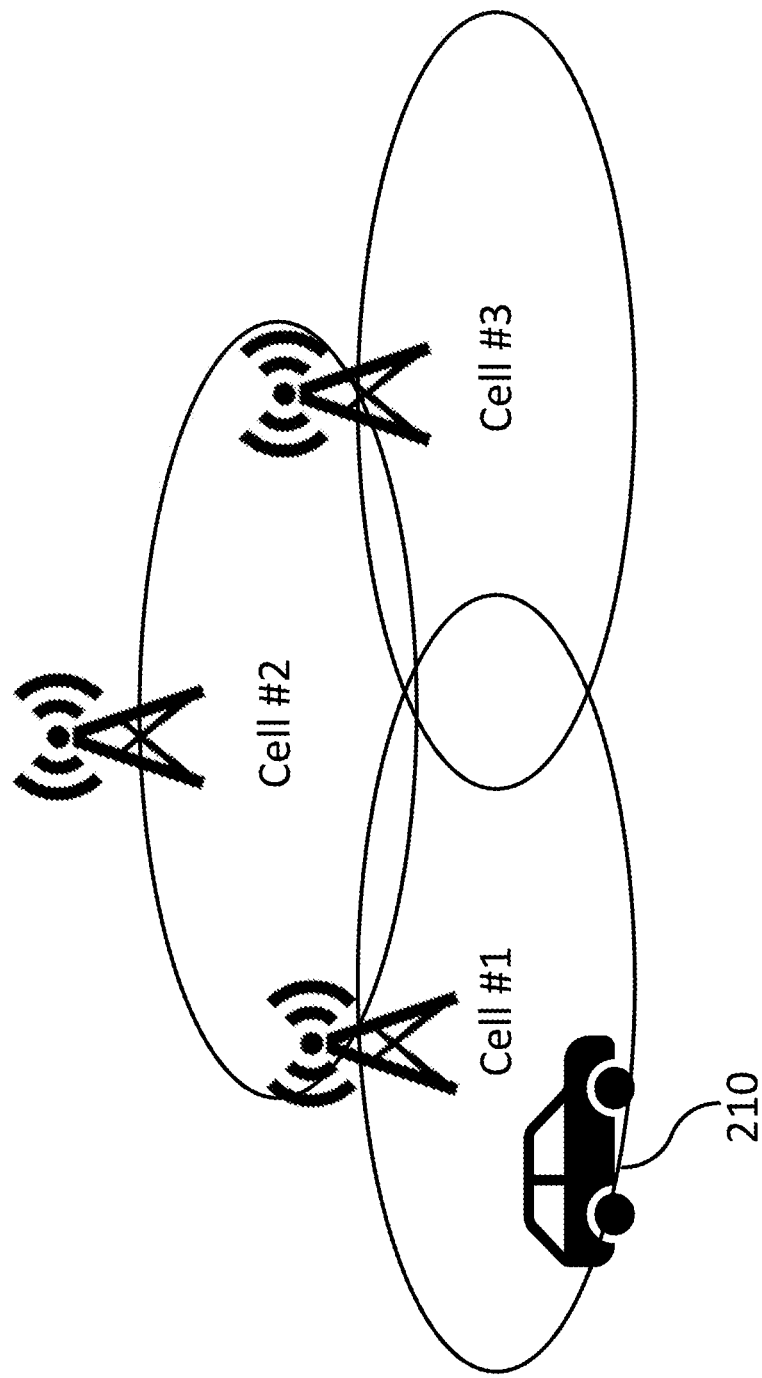
FIG. 2 is a diagram illustrating a vehicle accessing an area-based exceptional resource pool according to an example implementation of the present disclosure.

FIG. 2 is a diagram 200 illustrating a vehicle 210 accessing an area-based exceptional resource pool according to an example implementation of the present disclosure. In one implementation, one area-based Exceptional Resource Pool may be valid across the coverage of {Cell #1, Cell #2, Cell #3}.That is, the Exceptional Resource Pool for the vehicle 210 may remain valid when the vehicle 210 moves within the valid area that includes Cell #1, Cell #2, and Cell #3. A cell is a logical entity for a BS to manage radio resource. In one implementation, one BS may broadcast DL synchronization signaling (e.g., synchronization signal block (SSB)) in DL direction (continuously or discontinuously). In one implementation, the coverage of one cell may depend on the Received Signal Strength that the UE may receive from the BS (in DL direction). For example, the area of a cell may be the combinations of the locations where the (Reference Signal) signal quality received by UE, such as DL Reference Symbol Received Power (DL-RSRP)/DL Reference Signal Received Quality (DL-RSRQ)/DL Signal to Interference plus Noise Ratio (DL-SINR), higher than a predefined threshold. In one implementation, the areas may be defined based on the physical distance between the UE and the BS, where the distance may be determined based on other technologies, such as New Radio positioning or Global Navigation Satellite System (GNSS). In one implementation, the area of one cell may be defined by other RATs, such as GNSS, New Radio Positioning technique in 3GPP specification, or the zone configuration in LTE/NR V2X.

Figure 3:
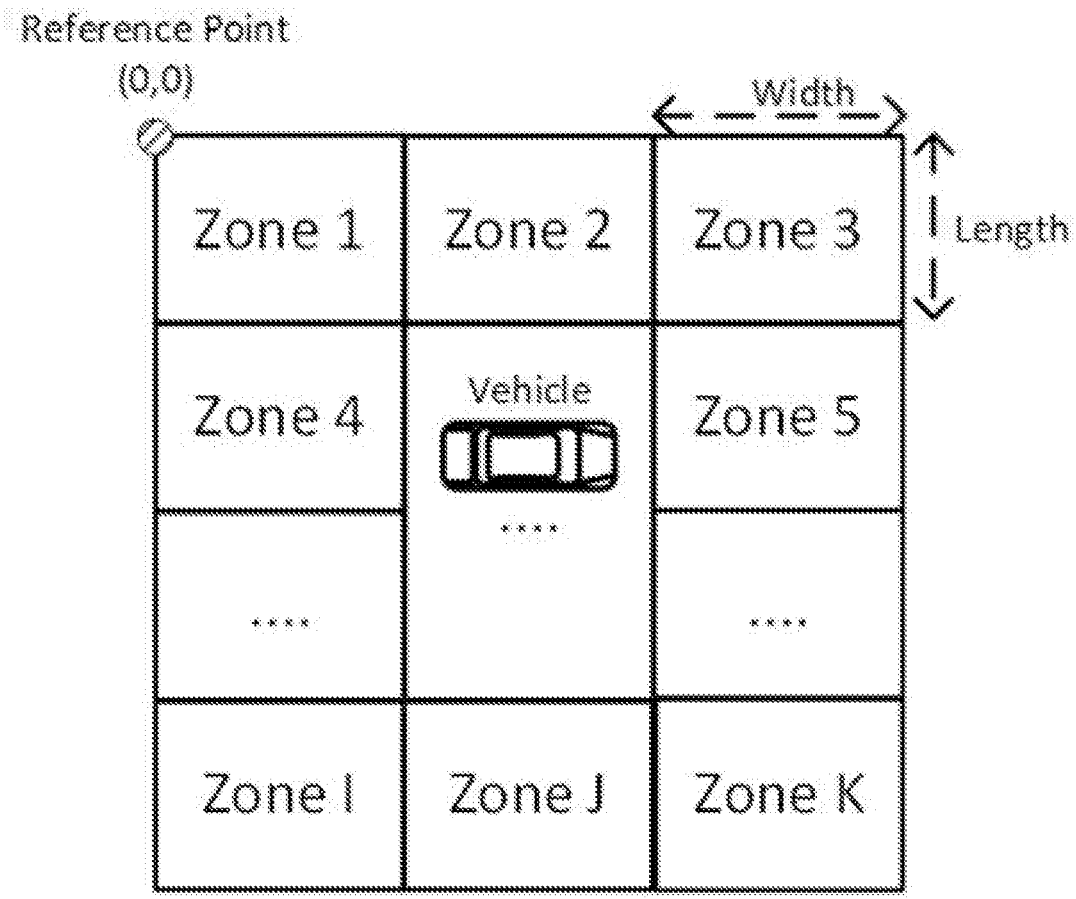
FIG. 3 is a diagram illustrating a zone-based sidelink resource pool configuration according to an example implementation of the present disclosure.

FIG. 3 is a diagram 300 illustrating a zone-based sidelink resource pool configuration according to an example implementation of the present disclosure. One geographical area may be divided into several logical zones by the BS (or pre-configuration). Each zone may be configured with one zone identity. A fixed reference point (e.g., geographical coordinates (0, 0)), length and width of one zone may be provided with the zone configuration. The UE may determine the zone identity by means of modulo operation using length and width of each zone, the number of zones in length, the number of zones in width, the single fixed reference point and the geographical coordinates of the UE's current location. The length and width of each zone, the number of zones in length and the number of zones in width may be provided by the BS when the UE is in coverage and pre-configured when the UE is out of coverage. For an in-coverage UE, when the UE uses UE autonomous resource selection, the BS may provide the mapping between zone(s) and (V2X) sidelink transmission resource pools in broadcasting signalling (e.g., system information) in RRC signalling (e.g., for the sidelink configuration in neighbouring frequency(-ies)). For out-of-coverage UEs, the mapping between the zone(s) and V2X sidelink transmission resource pools may be pre-configured.

Table 2 lists examples of a physical scope of a validity area

TABLE 2

| | | Validity Area |
|---|---|---|
| Config. #1 | (1) | One Exceptional Resource Pool may be associated with one or more than one systemInformationAreaID list (which includes one or more than one systemInformationAreaID) as the validity area in the corresponding Exceptional Resource Pool configuration. |
| | (2) | In one implementation, one systemInformationAreaID may be further associated with one Public Land Mobile Network (PLMN) identity and so the systemInformationAreaID list may include the systemInformationAreaIDs associated with multiple PLMNs (e.g., systemInformationAreaID list = sequence {systemInformationAreaID, PLMN identity}). |
| | (3) | Validity control: |
| | a. | In one implementation, the cell may broadcast one systemInformationAreaID (w/wo associated PLMN identity) or one systemInformationAreaID list (w/wo associated PLMN identity) in system information (e.g., in systeminformationblocktype1, other SI, V2X-SI). The cell may broadcast the V2X-SI periodically or on demand. The cell may unicast the V2X-SI on demand via dedicated signaling. |
| | b. | By reading the systemInformationAreaID (w/wo associated PLMN identity) or the systemInformationAreaID list (w/wo associated PLMN identity), the UE may identify whether the stored Exceptional Resource Pool configuration(s) is valid or not. |
| | c. | In one implementation, the Exceptional Resource Pool configuration in the V2X-SI may be associated with one systemInformationAreaID, which is also the valid area of the V2X-SI associated with the Exceptional Resource Pool configuration. In this condition, the validity of Exceptional Resource Pool configuration may follow the validity of V2X-SI. In one implementation, the Exceptional Resource Pool configuration in the V2X-SI may be associated with a systemInformationAreaID list unrelated to the validity area of the corresponding V2X-SI. For example, the V2X-SI (e.g., SIB12) may be broadcasted by the serving cell continuously and the V2X-SI may be associated with one systemInformationAreaID, which may be broadcasted in the SIB1. However, the serving cell may also indicate a systemInformationAreaID list to be associated with the (at least one) Exceptional Resource Pool configuration in the V2X-SI. A V2X UE may identify whether one Exceptional Resource Pool is accessible by identifying the associated systemInformationAreaID list. The UE may know that the validity area of the Exceptional Resource Pool may be different from the validity area of V2X-SI (broadcasted in the SIB1). |
| | Note: | In one implementation, one additional systemInformationAreaID-V2X may be applied to define the validity area of V2X-SI. Therefore, the UE may not request V2X-SI if the UE already stores a V2X-SI with one systemInformationAreaID-V2X and the UE is located on a cell that broadcasts the same systemInformationAreaID-V2X in the system information. In contrast, the UE may be triggered to enquire the valid V2X-SI after the UE is moving out of the area that broadcasts the corresponding systemInformationAreaID-V2X(e.g., when the UE is selecting another cell that does not broadcast any systemInformationAreaID or the selected cell broadcasts a different systemInformationAreaID). In addition, the proposed systemInformationAreaID-V2X may also be applied to define the validity area of Exceptional Resource Pool. |

TABLE 2-continued

Validity Area

Figure 4:
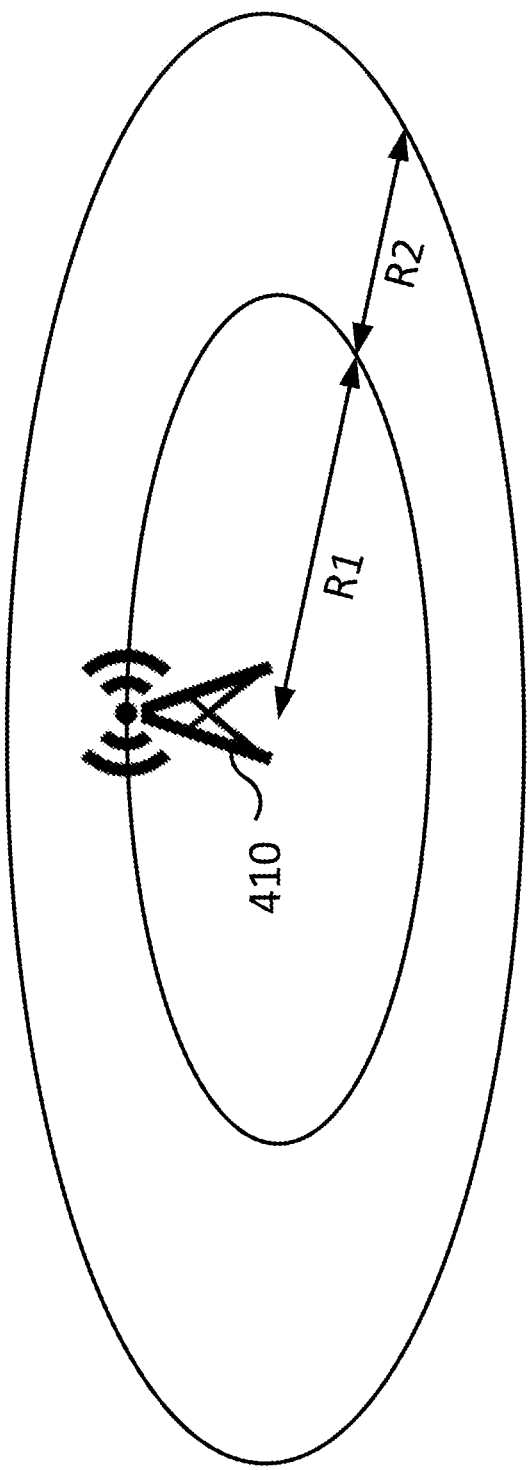
FIG. 4 is a diagram illustrating an area-based Exceptional Resource Pool configuration depending on a distance between a UE and a base station (BS) according to an example implementation of the present disclosure.

| | | |
|---|---|---|
| Config. #2 | (1) | One Exceptional Resource Pool may be associated with one or more than one Cellidentity list (which includes one or more than one Cellidentity) as the validity area in the corresponding Exceptional Resource Pool configuration. |
| | (2) | In one implementation, one Cellidentity may be further associated with one PLMN identity and so the Cellidentity list may include the Cellidentities associated with multiple PLMNs (e.g., Cellidentity list = sequence {Cellidentity, PLMN identity}). |
| | (3) | Validity control: |
| | a. | In one implementation, the cell may broadcast one Cellidentity (w/wo associated PLMN identity) or a Cellidentity list (w/wo associated PLMN identity) in system information (e.g., in systeminformationblocktype1, other SI, V2X-SI). The cell may broadcast the V2X-SI periodically or on demand. The cell may unicast the V2X-SI on demand via dedicated signaling. |
| | b. | By reading the Cellidentity (w/wo associated PLMN identity), the UE may identify whether the stored Exceptional Resource Pool configuration(s) is valid or not. |
| | c. | In one implementation, the physical cell identifier (PCI) of Cell(s) in the serving RAN may be applied to represent the cellidentiy in implementations in Config. #2. |
| Config. #3 | (1) | One Exceptional Resource Pool may be associated with one or more than one RAN Area Code (RANAC) list (which includes one or more than one RANAC) as the validity area in the corresponding Exceptional Resource Pool configuration. |
| | (2) | In one implementation, one RANAC (or all of a subset of the RANAC list) may be further associated with one tracking area code (TAC), where one RANAC and its associated TAC may compose one "RAN Area ID." One Exceptional Resource Pool may be associated with one RAN Area ID or a RAN Area ID list. |
| | (3) | In one implementation, one RANAC or RAN Area ID may be further associated with one PLMN identity and so the RANAC list may include the RANACs associated with multiple PLMNs (e.g., RANAC list = sequence {RANAC, PLMN identity}). |
| | (4) | Validity control: |
| | a. | In one implementation, the cell may broadcast one (or more than one) RANAC (w/wo associated PLMN identity) in system information (e.g., in systeminformationblocktype1, other SI, V2X-SI). The cell may broadcast the V2X-SI periodically or on demand. The cell may unicast the V2X-SI on demand via dedicated signaling. |
| | b. | By reading the RANAC (list) (w/wo associated PLMN identity(s)) or RAN Area ID (list) (w/wo associated PLMN identity(s)), the UE may identify whether the stored Exceptional Resource Pool configuration(s) is valid or not. |
| Config. #4 | (1) | One Exceptional Resource Pool may be associated with one or more than one Tracking Area Code (TAC) list (which includes one or more than one TAC) as the validity area in the corresponding Exceptional Resource Pool configuration. |
| | (2) | In one implementation, one TAC may be further associated with one PLMN identity and so the TAC list may include the TACs associated with multiple PLMNs. (e.g., TAC list = sequence {TAC, PLMN identity}). |
| | (3) | Validity control: |
| | a. | In one implementation, the cell may broadcast one (or more than one) TAC (w/wo associated PLMN identity) in system information (e.g., in systeminformationblocktype1). |
| | b. | By reading the TAC (w/wo associated PLMN identity), the UE may identify whether the stored Exceptional Resource Pool configuration(s) is valid or not. |
| Config. #5 | | In one implementation, the area-based Exceptional Resource Pool configuration may be valid based on the distance between the UE (such as the vehicle 210 in FIG. 2) and the BS. |
| | | FIG. 4 is a diagram 400 illustrating an area-based Exceptional Resource Pool configuration depending on a distance between a UE and a BS according to an example implementation of the present disclosure. An Exceptional Resource Pool #1 may be valid to one UE when the distance between the UE and the BS 410 is less than R1. In contrast, an Exceptional Resource Pool #2 may be valid to the UE when the distance between the UE and the BS 410 is greater than R1. In one implementation, R2 may also be specified in the control signaling for indicating a valid area for an Exceptional Resource Pool. The configuration for the Exceptional Resource Pool #1 and the Exceptional Resource Pool #2 may be different in numerology, sidelink packet duplication configuration, sidelink packet repetition configuration, sidelink CBR configuration, etc. For example, the BS 410 configures the value of R1 = 100(m). The UE may estimate the distance between itself and the BS 410 through: |

TABLE 2-continued

Validity Area

| | | |
|---|---|---|
| | a. | the received DL signal strength (such as DL-RSRP/DL-RSRQ/DL-RSSI/DL-SINR); |
| | b. | a zone ID configuration provided in the LTE/NR V2X protocols; or |
| | c. | the help of other RAT (such as GNSS or NR positioning) to estimate the geometric distance between the UE and BS 410. |

The UE may access Exceptional Resource Pool #1 if the distance between the UE and the BS 410 is smaller than R1 (e.g., 100 m). Otherwise, the UE may access Exceptional Resource Pool #2 if the distance between the UE and the BS 410 is larger than R1.

In one implementation, the UE may keep the invalid area-based Exceptional Resource Pool configuration until the stored area-based Exceptional Resource Pool configuration is replaced by a broadcasting message or dedicated control signaling provided by another serving cell. For example, the UE may still keep/store the configuration of Exceptional Resource Pool#1 after the UE leaves the area defined by R1. In another implementation, the UE may start to count a timer (e.g., the initial value of the timer may be configured by the serving cell or be pre-configured in the technical specifications) when the stored Exceptional Resource Pool configuration becomes invalid. The UE may keep the stored Exceptional Resource Pool configuration until the timer expires. Then, the UE may remove the stored Exceptional Resource Pool configuration when the timer expires.

In one implementation, the UE may release/discard the stored Exceptional Resource Pool configuration(s) if the stored Exceptional Resource Pool configuration(s) is determined as invalid. For example, the UE may remove a stored area-based Exceptional Resource Pool configuration when the UE leaves the validity area associated with the Exceptional Resource Pool.

| | | |
|---|---|---|
| Config. #6 | | In one implementation, validity of an area-based Exceptional Resource Pool configuration may depend on an area code. The area code may be "ExceptionalResourcePoolValidityAreaID". For example, |
| | (1) | Each Exceptional Resource Pool may be configured with one or more than one ExceptionalResourcePoolValidityAreaID. The ExceptionalResourcePoolValidityAreaID may be a bit string. |
| | (2) | Cell may broadcast (at least) one "ExceptionalResourcePoolValidityAreaID" in system information (e.g., in SIB1 or in V2X-SI). After receiving system information, the UE may identify whether a previously stored Exceptional Resource Pool configuration (which may be configured by a previous serving cell(s)) is valid or not. |
| Note | | Note #1: The Area-based Exceptional Resource Pool configuration(s) may be provided to the UE through following approaches: |
| | (1) | Broadcasting system information. In this case, the serving cell may periodically broadcast V2X system information (V2X-SI), which may include the Exceptional Resource Pool configuration. In one implementation, the Exceptional Resource Pool configuration for LTE V2X service may be only provided by a 'LTE V2X-SI', which only covers the sidelink configuration for LTE V2X service (e.g., SIB21 or SIB26 in LTE protocols); the Exceptional Resource Pool configuration for NR V2X (or NR sidelink) service may be only provided by a 'NR V2X-SI', which only covers the sidelink configuration for NR V2X service. In one implementation, both of the "Exceptional Resource Pool configuration for LTE V2X service" and the "Exceptional Resource Pool configuration for NR V2X service" may be provided in one system information block. For example, one NR V2X-SI (or one LTE V2X-SI) may include both of the "Exceptional Resource Pool configuration for LTE V2X service" and the "Exceptional Resource Pool configuration for NR V2X service". |
| | (2) | On-demand system information delivery. In this case, one cell may not continuously broadcast V2X-SI. Instead, the UE served by the cell may need to send a "system information request" message to the cell for system information enquiry. After receiving the "system information request" message, the cell may start to broadcast the V2X-SI (which includes Exceptional Resource Pool configuration(s)) for a time period. In some additional implementations, the serving cell may deliver the requested system information to the UE (which sends the system information request message) through UE-specific unicast (dedicated) control signaling (e.g., RRC signaling in DL direction), which may be encoded by the serving cell with one UE-specific Cell-RadioNetworkTemporaryIdentifier (C-RNTI). One UE (e.g., a UE in RRC connected state) may be configured with one UE-specific C-RNTI by its serving cell(s). Therefore, the UE may also be able to decode the UE-specific RRC signaling (transmitted from the serving cells) by using its configured C-RNTI(s) while the RRC signaling is transmitted from the serving cell. In some additional implementations, the system information request message (e.g., UL UE-specific (dedicated) control signaling, such as RRC signaling) may also be encoded by the UE |

TABLE 2-continued

Figure 5:
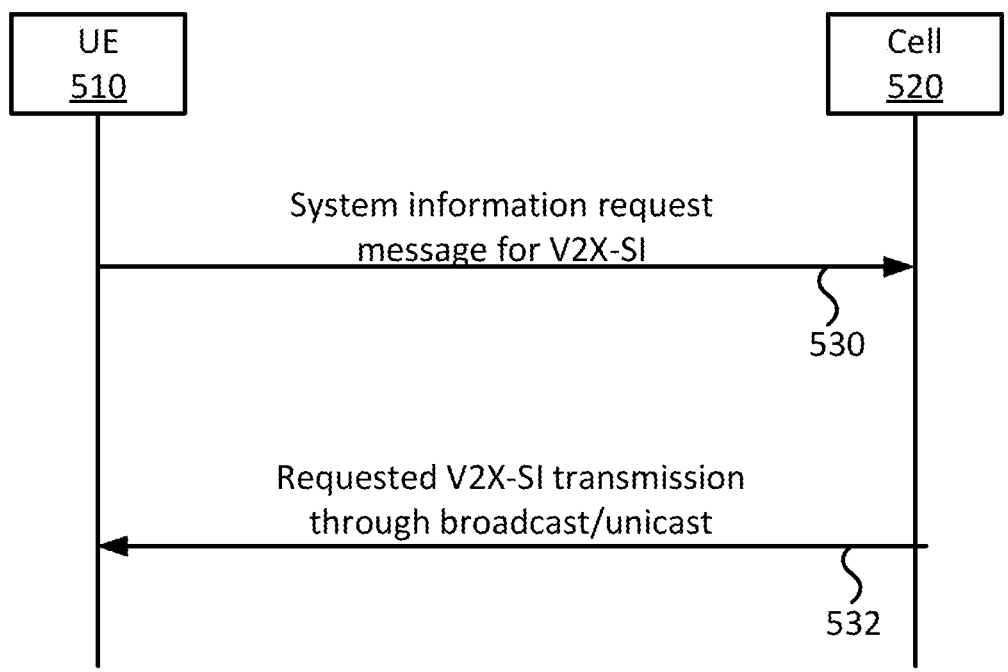
FIG. 5 is a diagram illustrating an on-demand system information request procedure according to an example implementation of the present disclosure.

| | Validity Area |
|---|---|
| | through the given C-RNTI. That is, the system information request message may also be also UE-specific and the serving cell may also decode the system information request message by using the C-RNTI dedicated to the UE. Different serving cells (e.g., the primary cell or primary secondary cell of the UE) may configure different C-RNTIs to the UE.<br>In some additional implementations, the UE may send the "system information request" message to the serving cell through (2-step/4-step) random access procedure. In one implementation, some specific random access resource, such as preamble or physical resource blocks, may be reserved and shared by UE(s) to send the system information request message. After receiving the system information request message transmitted from the UE through random access procedure, the serving cell may start to broadcast the requested system information (e.g., the V2X-SI) for a time period.<br>FIG. 5 is a diagram 500 illustrating an on-demand system information request procedure according to an example implementation of the present disclosure. In action 530, the UE 510 may transmit a system information request message for V2X-SI to the cell 520. In one implementation, the system information request message may be encoded with the C-RNTI specific to the UE 510. In action 532, the cell 520 may transmit the requested V2X-SI through either a broadcast or a unicast approach. In one implementation, the requested V2X-SI may be encoded with the UE-specific C-RNTI. In another implementations, the requested V2X-SI may be encoded with a System Information-RNTI (SI-RNTI).<br>In one implementation, the UE 510 may further indicate which V2X-SI that the UE needs in the system information request message. The requested V2X-SI may include (any combinations of) SIB12 (for NR sidelink service configuration and NR PC5 interface configuration), SIB13/SIB14 (for LTE V2X (sidelink) service configuration and E-UTRA PC5 interface configuration) in the NR protocols or SIB21/SIB26 in LTE protocols. The cell 520 may be an NR cell or an E-UTRA cell. In one implementation, the cell 520 may deliver a subset of the requested V2X-SI through the broadcast/unicast approach. |
| (3) | In one implementation, the Exceptional Resource Pool configuration for LTE V2X service may be only provided by a 'LTE V2X-SI', which only covers the sidelink configuration for LTE V2X service (e.g., SIB21 or SIB26 in LTE protocols or SIB13 and SIB14 in NR protocols); the Exceptional Resource Pool configuration for NR V2X service may be only provided by a 'NR V2X-SI' (e.g., SIB12 in the NR protocols), which only covers the sidelink configuration for NR V2X service. In addition, the LTE V2X-SI and NR V2X-SI may be different SIBs. The UE may need to send two independent "system information request" messages for requesting LTE V2X-SI and NR V2X-SI, respectively.<br>In one implementation, both of the "Exceptional Resource Pool configuration for LTE V2X service" and the "Exceptional Resource Pool configuration for NR V2X service" may be provided in one system information block. For example, one NR V2X-SI may include both of the "Exceptional Resource Pool configuration for LTE V2X service" and the "Exceptional Resource Pool configuration for NR V2X service". In some additional implementations, UE may request the SIB for LTE V2X service (e.g., SIB13/14 in NR protocols) and the SIB for NR sidelink service (e.g., SIB12 in NR protocols) within one system information request. Therefore, the UE may only need to send one "system information request" message for NR V2X-SI to obtain "Exceptional Resource Pool configuration for LTE V2X service" and "Exceptional Resource Pool configuration for NR V2X service". |
| (4) | Dedicated control signaling, such as<br>  i.  RRC(Connection)Reconfiguration message<br>      In one implementation, the area-based Exceptional Resource Pools may be configured in the 'ReconfigurationWithSync' IE (if the 'ReconfigurationWithSync' IE is configured in the RRCConnectionReconfiguration message). In one implementation, the area-based Exceptional Resource Pools may be configured independently of the 'ReconfigurationWithSync' IE.)<br>  ii.  RRC(Connection)Release message<br>      In one implementation, the area-based Exceptional Resource Pool configuration may be configured in a suspend configuration (if the suspend configuration is sent). In one implementation, the area-based Exceptional Resource Pool configuration may be provided independently of the suspend configuration. |

TABLE 2-continued

Validity Area

It should be noted that the proposed area-based Exceptional Resource Pool configuration and the proposed signaling delivery approach may be implemented to both NR V2X service (or NR sidelink service) and LTE V2X service. In addition, both the Exceptional Resource Pools for NR-V2X service and the Exceptional Resource Pools for LTE-V2X may be configured jointly to the UE in one control signaling (e.g., in one dedicated control signaling or in one V2X-SI).

Note #2: In one implementation, one (or part of) V2X-SI may be associated with one (or more than one) specific PLMN, which means that (part of) the V2X-SI may be valid only to the UE(s) that is registered to the corresponding PLMN. In addition, one cell may broadcast multiple V2X-SI(s). In addition, each V2X-SI (or part of each V2X-SI) may be associated with one (or more than one) specific PLMN.

In this condition, the Cell identity/RAN Area ID/RANAC/TAC list in the V2X-SI may also be directly associated with one given PLMN identity list, which includes one or more than one PLMN identity (PLMN ID) in the V2X-SI explicitly. After receiving the V2X-SI, the UE may refer the configured PLMN ID (list) in the V2X-SI and the corresponding Cell identity/RAN Area ID/RANAC/TAC list to figure out the validity area of one Exceptional Resource Pool. In one implementation, the UE may refer to the $1^{st}$ PLMN ID in the PLMN identity list, which may be provided in SIB1 (systeminformationblocktype1) for RAN sharing. Please note, in some implementations, one area-based Exceptional Resource Pool configuration may be valid on one or more than one PLMN. The PLMN ID(s) of valid PLMN may be associated with the validity area (e.g., which may be defined by one or more than one cellidentity/RAN Area ID/RANAC/TAC) in one area-based Exceptional Resource Pool configuration.

Note #3: One V2X-SI may include more than one Exceptional Resource Pool configurations. In addition, the configured Exceptional Resource Pools configuration may be distributed on different sidelink frequency carriers, which may be the primary frequency carrier (the operating frequency carrier of PCell or PSCell of the UE) or secondary frequency carrier (the operating frequency carrier of SCell of the UE) or other additional frequency carrier configured by service providers to support NR sidelink service or LTE V2X service. The proposed implementations with respect to the validity area may be applicable to all of the frequency carriers, which include primary frequency carrier, secondary frequency carrier(s), and other frequency carriers configured by the RAN (or pre-configuration) for sidelink packet transmission/reception in the LTE/NR PC5 interface.

Note #4: In some of the embodiments, the V2X-SI may be divided into two (or more than two) parts, which are called sub-V2X-SI in the present disclosure. In addition, one sub-V2X-SI may be associated with different validity areas. In one implementation, (at least) one of the sub-V2X-SI may include the proposed area-based Exceptional Resource Pool configuration. The validity area of this sub-V2X-SI may depend on the configured proposed validity area of the Exceptional Resource Pool configuration(s). The UE may be triggered to request all (or a subset of) sub-V2X-SI(s) by an on-demand SI procedure or the UE may start to monitor new sub-V2X-SI(s) broadcasted by the serving RAN. In some additional implementations, the serving cell may divide one V2X-SI (e.g., SIB12 or SIB13 or SIB14 in the NR protocols) up to 64 segments (e.g., up to 64 sub-V2X-SIs). In addition, each sub-V2X-SI may be associated with one sub-V2X-SI ID. In some implementations, all of the sub-V2X-SI may be associated with the same validity area. Moreover, in one implementation, the UE may need to receive all of the sub-V2X-SI(s) to re-assemble a valid V2X-SI. In some additional implementations, one End-Marker may also be transmitted in one of the sub-V2X-SI to inform the UE the number of total sub-V2X-SIs segmented by the serving cell. For example, one V2X-SI (e.g., SIB12) may be segmented into 64 sub-V2X-SIs. Then, one sub-V2X-SI ID, with a range from sub-V2X-SI ID#0 to sub-V2X-SI ID#63, may be configured to be uniquely associated with one sub-V2X-SI. In addition, the End-Marker may be configured within the sub-V2X-SI having sub-V2X-SI ID#63. In this way, the UE may know that there are 64 sub-V2X-SIs in total for reception and decoding. UE may need to receive all of the 64 sub-V2X-SIs to re-assemble the required V2X-SI (e.g., the SIB12). In contrast, during the sub-V2X-SI reception procedure, the UE may not be able to assemble a valid V2X-SI unless the UE could collect all of the sub-V2X-SIs from the serving cell. Note#5: In some implementations, the cells located in the validity area of the sub-V2X-SI may not need to broadcast the sub-V2X-SI and thus the signaling overhead may be reduced. In one implementation, the sub-V2X-SI that contains the (area-based) Exceptional Resource Pool configuration may be broadcasted in different approach(es) than other sub-V2X-SI(s). For example, a cell may broadcast the sub-V2X-

TABLE 2-continued

Validity Area

SI that contains the (area-based) Exceptional Resource Pool configuration
continuously and broadcast the other sub-V2X-SI through SI on-demand
procedure, or vice versa.
Note #6: Implementations in the present disclosure may also be applicable
to an intra-RAT scenario, where LTE V2X-SI (or LTE sub-V2X-SI or
LTE RRC signaling) may indicate the (area-based) Exceptional Resource
Pool configuration for LTE V2X service, and NR V2X-SI (or NR sub-
V2X-SI or NR RRC signaling) may indicate the (area-based) Exceptional
Resource Pool configuration for NR V2X service.
Note #7: Implementations in the present disclosure may also be applicable
to an inter-RAT scenario, where LTE V2X-SI (or LTE sub-V2X-SI or LTE
RRC signaling) may indicate the (area-based) Exceptional Resource Pool
configuration for NR V2X service, and NR V2X-SI (or NR sub-V2X-SI
or NR RRC signaling) may indicate the (area-based) Exceptional
Resource Pool configuration for LTE V2X service.
Note #8: In one implementation, the validity area of one Exceptional
Resource Pool configuration for LTE V2X service may be composed of one
(or more than one) LTE Cell identity/RAN Area ID/RANAC/TAC and one
(or more than one) NR Cell identity/RAN Area ID/RANAC/TAC. In one
implementation, the validity area of one Exceptional Resource Pool
configuration for LTE V2X service may be composed of one (or more than
one) LTE Cell identity/RAN Area ID/RANAC/TAC. In one
implementation, the validity area of one Exceptional Resource Pool
configuration for LTE V2X service may be composed of one (or more than
one) NR Cell identity/RAN Area ID/RANAC/TAC without any LTE Cell
identity/RAN Area ID/RANAC/TAC.
Similarly, in one implementation, the validity area of one Exceptional
Resource Pool configuration for NR sidelink service may be composed of
one (or more than one) LTE Cell identity/RAN Area ID/RANAC/TAC and
one (or more than one) NR Cell identity/RAN Area ID/RANAC/TAC. In
one implementation, the validity area of one Exceptional Resource Pool
configuration for NR sidelink service may be composed of one (or more
than one) NR Cell identity/RAN Area ID/RANAC/TAC. In one
implementation, the validity area of one Exceptional Resource Pool
configuration for NR sidelink service may be composed of one (or more
than one) LTE Cell identity/RAN Area ID/RANAC/TAC without any NR
Cell identity/RAN Area ID/RANAC/TAC.

Case #2: Valid RRC State Configuration

In one implementation, a cell may only support RRC connected UE to implement sidelink packet transmission/reception. Even if an Exceptional Resource pool is configured to a UE, the UE may access the area-based Exceptional Resource Pool only when the UE is also in a valid RRC state(s). Table 3 lists multiple implementations with respect to valid RRC state configuration for the (area-based) Exceptional Resource Pool configuration. It should be noted that the proposed mechanisms may also be applicable to non-area-based Exceptional Resource Pool configuration and normal Resource Pool configuration.

TABLE 3

Valid RRC state configuration for the Area-based Exceptional Resource Pool Configuration The (area-based) Exceptional Resource Pool configuration may indicate valid RRC state(s),
which may include any combination of RRC connected/inactive/idle state. For example,
(1) One Exceptional Resource Pool may be valid only to RRC connected UE.
(2) One Exceptional Resource Pool may be valid only to RRC idle UE.
(3) One Exceptional Resource Pool may be valid only to RRC inactive UE.
(4) One Exceptional Resource Pool may be valid only to RRC inactive and/or idle UE.
(5) One Exceptional Resource Pool may be valid to RRC connected/inactive/idle UE.
In one implementation, a stored (area-based) Exceptional Resource Pool may be invalid in
some special cases. For example, the stored (area-based) Exceptional Resource Pool that the
UE obtains from system information of a serving cell (or from a previous serving cell) may
be invalid during a handover procedure. In another implementation, a stored (area-based)
Exceptional Resource Pool may be invalid while the UE is in RRC connected state and the
UE is configured with other (area-based) Exceptional Resource Pool configuration through
UE-specific dedicated control signaling (e.g., the UE may receive another IE 'sl-
ConfigDedicatedNR' , which includes (area-based) Exceptional Resource Pool
configurations, within the RRCReconfiguration message). In this condition, the UE may only
apply the (area-based) Exceptional Resource Pool configuration in the sl-
ConfigDedicatedNR while the UE is in RRC connected state. Moreover, the UE may not be
allowed to apply the (area-based) Exceptional Resource Pool configuration in the sl-
ConfigDedicatedNR while the UE is in RRC connected state. Instead, the UE may be able to
apply the (area-based) Exceptional Resource Pool configuration in the system information
while the UE is in RRC inactive state or RRC idle state.

TABLE 3-continued

Valid RRC state configuration for the Area-based Exceptional Resource Pool Configuration

| | | |
|---|---|---|
| | In one implementation, the UE may only access the Exceptional Resource Pool configured in a handover command during the handover procedure. The handover command may be an RRC(Connection)Reconfiguration message with the IE 'mobilitycontrolinfo' or an RRCReconfiguration message with the IE 'reconfigurationwithsync'. In one implementation, the Exceptional Resource Pool configured in the handover command may be valid only during the handover procedure. | |
| Case #2-1 Explicit indication | (1) | One additional Information Element "Valid RRC state" may be provided to further indicate the valid RRC state for one Exceptional Resource Pool configuration. |
| | (2) | In one implementation, one "Valid RRC state" may be configured to all of the configured Exceptional Resource Pool configuration in one control message (e.g., one set of valid RRC states indication to all of the (area-based) Exceptional Resource Pool configuration in one system information message or in one dedicated RRC signaling). |
| | (3) | The valid RRC state may be delivered in broadcasting message (e.g., in system information, such as systeminformationblocktype1 other SI, V2X-SI). or dedicated control signaling (e.g., RRC signaling w/wo reconfigurationwithsync or mobilitycontrolinfo) by serving cell(s) or through pre-configuration. |
| Case #2-2 Pre-definition | In one implementation, the rules of applicable RRC states may be pre-defined (e.g., pre-defined in the technical specification). While the UE is located in the validity area of one Exceptional Resource Pool configuration, for example, | |
| | (1) | The Exceptional Resource Pools configuration delivered through system information may be applicable to all of the RRC states. |
| | (2) | The Exceptional Resource Pool configuration delivered through system information may be applicable to all of the RRC states except handover procedure. In one implementation, when one serving cell instructs one UE to implement handover procedure, the exceptional resource pool configuration may be provided in the (conditional) handover command message. The UE may apply the exceptional resource pool configuration for sidelink packet delivery during the handover procedure (e.g., Condition #4 in Table 1). |
| | (3) | The Exceptional Resource Pool configuration delivered through dedicated control signaling may be applicable only when the UE is in the RRC connected state. In one implementation, the Exceptional Resource Pool configuration may also be valid during the handover procedure and after the successful handover procedure. |
| | (4) | The (area-based) Exceptional Resource Pool configuration delivered through a handover command may only be valid during the handover procedure (e.g., Condition #4 in Table 1). In one implementation, the area-based Exceptional Resource Pool configuration may also be applied in a conditional handover procedure (as illustrated in FIG. 1), wherein more than one candidate target cells may be included in one conditional handover command. The UE may select one target cell among the given candidates after (at least) one triggering condition is fulfilled. In one implementation, one area-based Exceptional Resource pool configuration may be valid on one or more than one candidate target cell. In other words, a subset or all of the candidate cells may be located in the validity area. Therefore, from the perspective of signaling formant design, one area-based Exceptional Resource Pool configuration, which is valid on all (or a subset) of the candidate target cells, may be enough in the conditional handover procedure. |

Note:
(1) In one implementation, the UE may release one configured Exceptional Resource Pool configuration after transitioning to an RRC state that is invalid to the corresponding Exceptional Resource Pool.
(2) In one implementation, the UE may store the configured Exceptional Resource Pool configuration even when the UE is staying in an RRC state that is invalid to the corresponding Exceptional Resource Pool. In addition, in some conditions, the UE may re-access (and so re-validate) the Exceptional Resource Pool after the UE transitioning from an invalid RRC state to a valid RRC state. In some other implementations, the UE may directly release the stored Exceptional Resource Pool configuration that is invalid to the UE (based on the RRC state in the UE side).
(3) In another implementation, the UE may start to count a timer (e.g., the initial value of the timer may be configured by the serving cell or be pre-configured in the technical specifications) when the stored Exceptional Resource Pool configuration becomes invalid. The UE may keep the stored Exceptional Resource Pool configuration until the timer expires. Then, the UE may remove the stored Exceptional Resource Pool configuration when the timer expires.
(4) In one implementation, the UE may keep the stored area-based Exceptional Resource Pool configuration until it is replaced/overwritten by another Exceptional Resource Pool configuration that the UE receives later on.

Table 4 lists multiple implementations of area-based Exceptional Resource Pool configuration and valid RRC state configuration.

| | | Implementations |
|---|---|---|
| Case #2-3: System information | (1) | In one implementation, area-based Exceptional Resource Pools may be provided through system information. A UE may store the area-based Exceptional Resource Pool configuration by obtaining the broadcasting system information. In one implementation, the UE may |

Figure 6A:
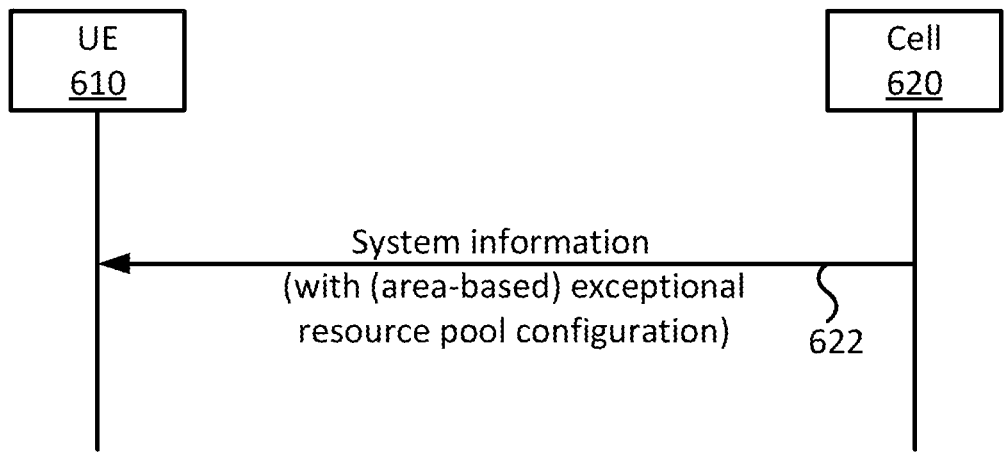
FIG. 6A is a diagram illustrating an (area-based) Exceptional Resource Pool configuration provided through system information according to an example implementation of the present disclosure.

| | Implementations |
|---|---|
| | obtain the V2X-SI through an on-demand SI procedure as illustrated in FIG. 6A. FIG. 6A is a diagram 600A illustrating an (area-based) Exceptional Resource Pool configuration provided through system information according to an example implementation of the present disclosure. In action 622, the UE 610 may receive an (area-based) Exceptional Resource Pool configuration through system information from the cell 620. In one implementation, the UE may release the stored (area-based) Exceptional Resource Pool configuration after leaving the validity area of the corresponding Exceptional Resource Pool configuration. |
| (2) | In one implementation, (part of) an area-based Exceptional Resource Pool configuration received through a (on-demand) system information reception procedure may be valid to UEs in RRC connected/inactive/idle state. The UE may keep the stored area-based Exceptional Resource Pools configuration without being impacted by RRC state transitions. That is, the area-based Exceptional Resource Pools configuration stored in the UE may be kept unaffected even if the UE transitions from one RRC state to another RRC state. |
| | a) (Conditional) Handover: In one implementation, the stored area-based Exceptional Resource Pool configuration may be still valid during the (conditional) handover procedure. For example, both of the source cell and the target cell may be located in the validity area of one (or more than one) Exceptional Resource Pool(s). |
| | In this condition, during (conditional) handover procedure, the UE may access the 'valid' area-based Exceptional Resource Pool(s) if the selected target cell is located in the validity area of at least one of the configured Exceptional Resource Pools (assuming no other area-based Exceptional Resource Pool configuration is configured in the (conditional) handover command to update the stored Exceptional Resource Pool configuration(s)). |
| | In some conditions, the serving cell may provide a new (area-based) Exceptional Resource Pool configuration in the (conditional) handover command (associated with the candidate target cell(s)) to modify or overwrite the stored Exceptional Resource Pool configuration. The UE may modify or replace the stored Exceptional Resource Pool configuration based on the new (area-based) Exceptional Resource Pool configuration in the (conditional) handover command. |
| | In one implementation, the area-based Exceptional Resource Pool configuration provided by a (on-demand) system information enquiry procedure may not be valid during the handover procedure. The serving cell may provide a new (area-based) Exceptional Resource Pool configuration in the (conditional) handover command to overwrite or keep the stored Exceptional Resource Pool configuration. |
| | b) The UE may apply the stored area-based Exceptional Resource Pool configuration under the following conditions: Physical layer problem (e.g., Condition #1 in Table 1) After sending RRC (Connection) Re-establishment Request (e.g., Condition #2 in Table 1) During RRC (Connection) Re-establishment procedure (e.g., Condition #3 in Table 1) While CBR or other sidelink measurement is not available (e.g., Condition #5 in Table 1) While the UE is initiating an RRC (Connection) Establishment procedure (e.g., Condition #6 in Table 1) During a beam failure recovery procedure with the NR/LTE PCell, or during a beam failure recovery with other possible sidelink synchronization reference sources, such as NR UE, NR/LTE SCell, or NR/LTE PSCell or a NR/LTE cell. |
| | c) The UE may keep the stored area-based Exceptional Resource Pool configuration without being impacted by RRC state transitions. In one implementation, while the UE is transitioning to the RRC inactive state (e.g., from RRC connected state), the UE may keep the stored (area-based) Exceptional Resource Pool configuration as part of UE inactive AS Context. In addition, in one implementation, the UE may still keep the stored (area-based) Exceptional Resource Pool configuration after the UE transitions from the RRC inactive state to the RRC idle state (while the UE inactive AS Context may be released after the UE transitions to the RRC idle state). |

Figure 6B:
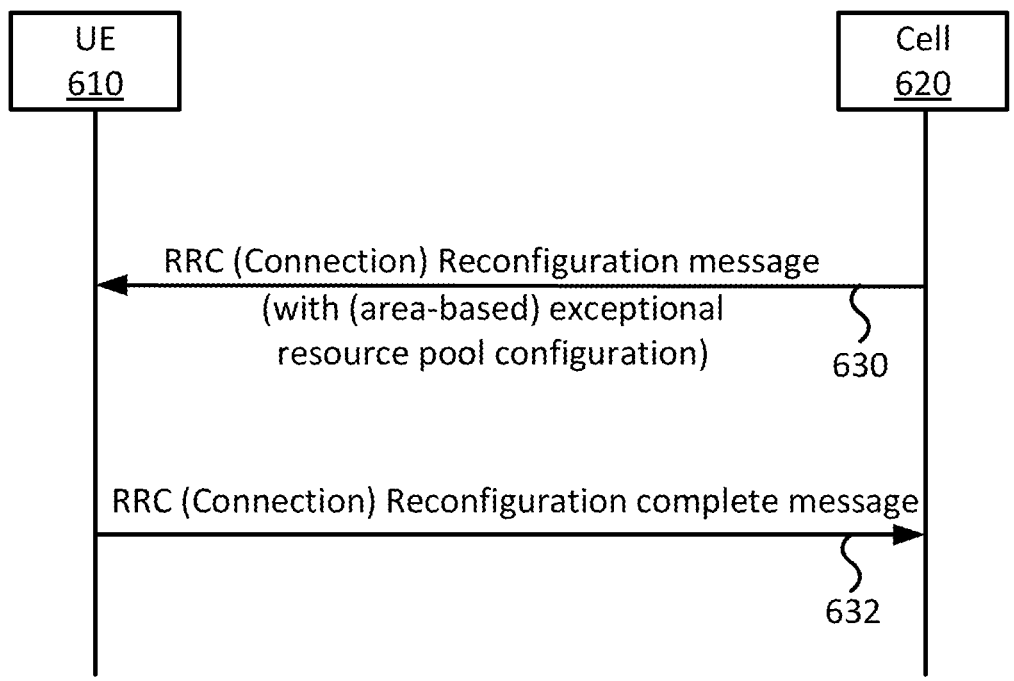
FIG. 6B is a diagram illustrating an (area-based) Exceptional Resource Pool configuration provided through dedicated control signaling according to an example implementation of the present disclosure.

| | Implementations |
|---|---|
| | In one implementation, in the system information, one (area-based) Exceptional Resource configuration may be configured with an explicit indicator to show that the corresponding Resource Pool is valid in all of the RRC states. In one implementation, the UE may implicitly know that the (area-based) Exceptional Resource Pool configuration is valid in all of the RRC states. |
| (3) | In one implementation, (part of) the configured area-based Exceptional Pool configurations may be valid only to RRC inactive/idle UE. The UE may not be allowed to access the valid Exceptional Resource Pool (based on the stored Exceptional Resource Pool configuration) while the UE is in the RRC connected state. However, in this condition, the UE may still store one Exceptional Resource Pool configuration until the UE leaves the corresponding validity area or the stored Exceptional Resource Pool configuration is overwritten by a new configuration. |
| a) | In one implementation, the stored area-based Exceptional Resource Pool configuration may not be valid during the (conditional) handover procedure. In this condition, each target cell may be associated with one (or more than one) Exceptional Resource Pool configuration in the (conditional) handover command, which may be valid only during the (conditional) handover procedure. In one implementation, the Exceptional Resource Pool configuration in the (conditional) handover command may also be area-based, which means the Exceptional Resource Pool may be valid on all (or a subset) of the candidate target cells in the (conditional) handover command. In one implementation, the Exceptional Resource Pool configuration may not be area-based and each Exceptional Resource Pool may be associated with one specific candidate target cell. |
| b) | Also, in this condition, the configured Exceptional Resource Pool configuration may not be valid during the Physical layer problem (e.g., Condition #1 in Table 1) or radio link failure, RRC Connection Re-establishment procedure (e.g., Condition #2/Condition#3 in Table 1), while CBR is not available (e.g., Condition #5 in Table 1). In one implementation, the configured (area-based) Exceptional Resource Pool configuration may still be valid to RRC connected UE. |
| c) | In one implementation, when the (area-based) Exceptional Resource Pool configuration in SI is invalid to an RRC connected UE, the serving cell may provide another valid Exceptional Resource Pool configuration, which may or may not be area-based, to the UE through dedicated control signaling (e.g., an RRC Connection Re-configuration message). |
| d) | In one implementation, the UE may keep the stored area-based Exceptional Resource Pool configuration while the UE is transitioning from the RRC inactive state to the RRC idle state. In one implementation, in the system information, one (area-based) Exceptional Resource configuration may be configured with an explicit indicator to show that the corresponding Resource Pool is valid only to RRC inactive/idle state. In one implementation, the UE may implicitly know that the (area-based) Exceptional Resource Pool configuration is valid in only the RRC inactive/idle state. |
| e) | In one implementation, the UE may still store the (area-based) Exceptional Resource Pool configuration after transitioning to the RRC connected state. Thereafter the UE may reuse the stored (area-based) Exceptional Resource Pool configuration after transitioning from the RRC connected state to the RRC inactive/idle state (if the UE is still in the validity area of the corresponding Exceptional Resource Pool configuration). |
| Case #2-4 Dedicated control signaling | In one implementation, area-based Exceptional Resource Pools may be provided through dedicated control signaling. A UE may store the area-based Exceptional Resource Pool configuration by obtaining the dedicated control signaling as illustrated in FIG. 6B. FIG. 6B is a diagram 600B illustrating an (area-based) Exceptional Resource Pool configuration provided through dedicated control signaling according to an example implementation of the present disclosure. In action 630, the UE 610 may receive an (area-based) Exceptional Resource Pool |

-continued

| | Implementations |
|---|---|
| | configuration through dedicated signaling (e.g., an RRC (Connection) Reconfiguration message) from the cell 620. In action 632, the UE 610 may transmit an RRC (Connection) Reconfiguration complete message to the cell 620. |
| | In one implementation, the UE may release the stored (area-based) Exceptional Resource Pool configuration after leaving the validity area of the corresponding Exceptional Resource Pool configuration. In one implementation, the UE may release the stored (area-based) Exceptional Resource Pool configuration based on a NW command. |
| | The UE may obtain the (area-based) Exceptional Resource Pool configuration through RRC (Connection) Reconfiguration message/RRC (Connection) Resume message/RRC (Connection) Release message (w/wo suspend configuration)/RRC (Connection) setup message/RRC (Connection) Establishment message/RRC (Connection) Re-establishment message. |
| (1) | In one implementation, (part of) the area-based Exceptional Resource Pool configuration received through dedicated control signaling may be valid to UEs in RRC connected/inactive/idle state.<br>a) The UE may keep the stored (valid) area-based Exceptional Resource Pools configuration without being impacted by RRC state transitions. For example, while the UE is transitioning from the RRC connected state to the RRC inactive/idle state, the UE may keep the stored (area-based) Exceptional Resource Pool configuration. While the UE is transitioning from the RRC inactive/idle state to the RRC connected state, the UE may still store the area-based Exceptional Resource Pool configuration. In addition, in one implementation, the UE may still keep the stored (area-based) Exceptional Resource Pool configuration after the UE transitions from the RRC inactive state to the RRC idle state. In one implementation, the UE may release the invalid (area-based) Exceptional Resource Pool configuration after the UE leaves the validity area of the corresponding Exceptional Resource Pool.<br>b) (Conditional) Handover procedure: In one implementation, the stored area-based Exceptional Resource Pool configuration may be still valid during the (conditional) handover procedure. For example, both of the source cell and the target cell may be located in the validity area of one (or more than one) Exceptional Resource Pool(s).<br>In this condition, during (conditional) handover procedure, the UE may access the 'valid ' area-based Exceptional Resource Pool (based on the stored Exceptional Resource Pool configuration) if the selected target cell is located in the validity area of at least one of the configured Exceptional Resource Pools (assuming no other area-based Exceptional Resource Pool configuration is configured in the (conditional) handover command to update the stored Exceptional Resource Pool configuration(s)).<br>In some conditions, the serving cell may provide a new (area-based) Exceptional Resource Pool configuration in the (conditional) handover command to modify or overwrite the stored Exceptional Resource Pool configuration<br>c) For the RRC connected UE, the area-based Exceptional Resource Pool configuration may be applicable while the UE is during: Radio Link Failure procedure (e.g., Condition #1 in Table 1); RRC Connection Re-establishment procedure (e.g., Condition #2/#3 in Table 1), beam failure recovery procedure.<br>d) For the RRC inactive UE, the area-based Exceptional Resource Pool configuration may be applicable while the UE is performing RRC Connection Resume procedure.<br>e) For the RRC idle UE, the area-based Exceptional Resource Pool configuration may be applicable while the UE is performing RRC Connection Establishment procedure (e.g., Condition #6 in Table 1). |
| (2) | In one implementation, (part of) the configured area-based Exceptional Pool configurations may be valid only to the RRC connected UE.<br>a) In one implementation, the stored area-based Exceptional Resource Pool configuration may be still valid during the (conditional) handover procedure. Implementations in Case 2-4.(1)(b) related to (conditional) handover may also be applicable in this condition. In addition, the area-based Exceptional Resource Pool configuration may be valid during: Radio Link Failure, RRC Connection Re-establishment procedure, and beam failure recovery procedure. The area-based Exceptional Resource Pool configuration may not be valid in other conditions (e.g., while the UE is in RRC |

| | Implementations |
|---|---|
| | inactive/idle state). In one implementation, the UE may release the invalid Exceptional Resource Pool configuration after the UE transitions to the RRC inactive/idle state. In one implementation, the UE may still store the invalid Exceptional Resource Pool configuration after transitioning to the RRC inactive/idle state. If the UE is still under the validity area of the Exceptional Resource Pool configuration, the UE may reuse the stored Exceptional Resource Pool configuration after transitioning back to RRC connected state. |
| (3) | In one implementation, (part of) the configured area-based Exceptional Pool configurations may be valid only to RRC inactive/idle UE. The UE may not be allowed to access the stored Exceptional Resource Pool while the UE is in RRC connected state. However, in this condition, the UE may still store the Exceptional Resource Pool configuration until the UE leaves the corresponding validity area or the stored Exceptional Resource Pool configuration is overwritten by a new (area-based) Exceptional Resource Pool configuration. |
| a) | In one implementation, the stored area-based Exceptional Resource Pool configuration may not be valid during the (conditional) handover procedure. In this condition, each target cell may be associated with Exceptional Resource Pool configuration in the (conditional) handover command, which may be valid only during the (conditional) handover procedure. In one implementation, the Exceptional Resource Pool configuration in the (conditional) handover command may also be area-based, which means the Exceptional Resource Pool may be valid on all (or a subset) of the candidate target cells in the (conditional) handover command. In one implementation, the Exceptional Resource Pool configuration may not be area-based and each Exceptional Resource Pool may be associated with one specific candidate target cell. In one implementation, one Exceptional Resource Pool configuration (which is valid only during the (conditional) handover command) may also be area-based, where the validity area covers all or a subset of candidate target cells. |
| b) | Also, in this condition, the configured Exceptional Resource Pool configuration may not be valid during the Physical layer problem (e.g., Condition #1 in Table 1), and RRC Connection Re-establishment procedure (e.g., Condition #2 or Condition #3 in Table 1). In one implementation, the serving cell, which may not be the previous cell that provides the area-based Exceptional Resource Pool configuration, may provide another valid Exceptional Resource Pool configuration to the UE through broadcasting system information or dedicated control signaling (e.g., RRC Connection Re-configuration message). |
| c) | In one implementation, the UE may release the invalid Exceptional Resource Pool configuration after the UE transitions to the RRC connected state. In one implementation, the UE may still store the invalid Exceptional Resource Pool configuration after transitioning to the RRC connected state (if the UE is still under the validity area of the Exceptional Resource Pool configuration). Therefore, the UE may reuse the stored Exceptional Resource Pool configuration after transitioning back to the RRC inactive/idle state if the UE is still in the validity area of the Exceptional Resource Pool configuration. |

Case #3: Usage of Exceptional Resource Pools During Conditional Handover Procedure In LTE V2X service, one UE may receive 'MobilityControlInfoV2X' IE within a handover command (e.g., RRC Connection Reconfiguration with mobility control information). In addition, one exceptional resource pool configuration (e.g., v2x-Comm TxPoolExceptional) may be also provided in the MobilityControlInfoV2X. An example data structure of the MobilityControlInfoV2X IE is shown below.

```
MobilityControlInfoV2X ::= SEQUENCE {
    v2x-CommTxPoolExceptional    SL-CommResourcePoolV2X      OPTIONAL,
        -- Need OR
    v2x-CommRxPool               SL-CommRxPoolListV2X        OPTIONAL,
        -- Need OR
```

| | | |
|---|---|---|
| v2x-CommSyncConfig | SL-SyncConfigListV2X | OPTIONAL, -- Need OR |
| cbr-MobilityTxConfigList | SL-CBR-CommonTxConfigList | OPTIONAL -- Need OR |
| } | | |

In one implementation, the information elements in the MobilityControlInfoV2X may also be transmitted in the conditional handover command. More than one target cells and the corresponding (RRC) configurations of each candidate target cell may also be provided in the conditional handover command. For example, a new IE MobilityControlInfoV2X_NR of each candidate target cell may be provided in the conditional handover command to support LTE V2X service and/or NR sidelink service.

However, each candidate cell may be configured with independent MobilityControlInfoV2X to the UE, but the information in different MobilityControlInfoV2Xs may be the same. Referring to the example illustrated in FIG. 2, a UE staying in Cell #1 may receive one conditional handover command that includes two candidate target Cells {Cell#2, Cell#3}. If one Exceptional Resource Pool configuration is valid across Cell#2 and Cell#3, the same configuration may be transmitted twice.

In one implementation, the serving cell may transmit a conditional handover command with mobilityControlInfoV2X, which contains area-based Exceptional Resource Pool configuration. The validity area may include all or a subset of candidate target cells in the conditional handover command. Implementations with respect to the validity area in Table 2 may be applicable to the area-based Exceptional Resource Pool configuration. In one implementation, a new format of NR-MobilityControlInfoV2X may be provided.

Case #3-1: the conditional handover command may include a common control parameter for all of (or part of) the candidate target cells. In one implementation, one Common_V2XmobilityControlInfoV2X, which contains common part of V2X related control parameters to all of (part of) the candidate target cells, may be provided in the conditional handover command.

(a) (Bit string) In addition to Common_V2XmobilityControlInfoV2X, a bit string, v2x-Comm TxPoolExceptional_validityArea', may be configured in the conditional handover command. Each bit in the v2x-CommTxPoolExceptional_validityArea may be associated with one corresponding candidate target cell. In one implementation, a bit may be set to '1' (or 'true' as a Boolean value) if the associated candidate target cell belongs to the valid area of the corresponding Exceptional Resource Pool. In contrast, a bit may be set to '0' (or 'false' as a Boolean value) if the associated candidate target cell does not belong to the valid area of the corresponding Exceptional Resource Pool. In one implementation, each Exceptional Resource Pool configuration may be configured along with one v2x-CommTxPoolExceptional_validityArea to indicate whether the Exceptional Resource Pool configuration is valid in each corresponding candidate target cell.

Figure 7:
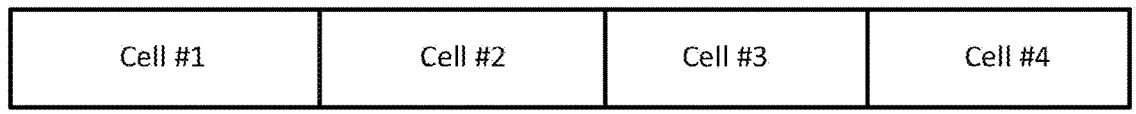
FIG. 7 is a diagram illustrating a bit string for candidate target cells according to an example implementation of the present disclosure.

FIG. 7 is a diagram 700 illustrating a bit string for candidate target cells according to an example implementation of the present disclosure. In this example, four candidate target Cells (Cell #1, Cell #2, Cell #3, Cell #4) are provided by the serving cell through dedicated control signaling (e.g., through an information element Candidate TargetCellsList in RRC(Connection)Reconfiguration message). The bit string illustrated in FIG. 7 (e.g., v2x-CommTxPoolExceptional_validityArea) may correspond to the sequence of candidate target cells in the Candidate TargetCellsList. For example, the leftmost bit (or the most significant bit, MSB) in the bit string may correspond to Cell #1, which is the $1^{st}$ Cell identity in the Candidate TargetCellsList. The second MSB in the bit string may correspond to Cell #2, which is the $2^{nd}$ Cell identity in the Candidate TargetCellsList. The third MSB in the bit string may correspond to Cell #3, which is the $3^{rd}$ Cell identity in the Candidate TargetCellsList. The rightmost bit (or the least significant bit, LSB) in the bit string may correspond to Cell #4, which is the $4^{th}$ Cell identity in the Candidate TargetCellsList. The length of Comm TxPoolExceptional_validityArea may depend on the number of candidate target cells provided in the conditional handover command.

In one implementation, the bit string for indicating the valid candidate target cell (as illustrated in FIG. 7) may be applicable to not only Exceptional Resource Pool but also other information elements for NR sidelink service/LTE V2X service.

(b) (Implicit approach) In one implementation, the Common_V2XmobilityControlInfoV2X may be applicable to all of the configured candidate target cells in the conditional handover command. The UE may implicitly know that the UE could access the Exceptional Resource Pool (based on the stored Exceptional Resource Pool configuration) directly without considering which candidate target cells that the UE selects.

(c) (Explicit approach) In one implementation, the v2x-CommTxPoolExceptional_validityArea may be one Boolean value. For example, the v2x-CommTxPoolExceptional_validityArea may be set to 'true' if the configured Exceptional Resource Pool configuration can be applied to all of the candidate target cells in the given conditional handover command.

(d) It should be noted that implementations of the validity area about the (area-based) Exceptional Resource Pool configuration, as listed in Table 2, may also be applicable in the conditional handover command and so the Common_V2XmobilityControlInfoV2X.

Case #4: New Usage of Exceptional Resource Pool Configuration

Case #4-1: V2X-SI Delivery Procedure

Figure 8:
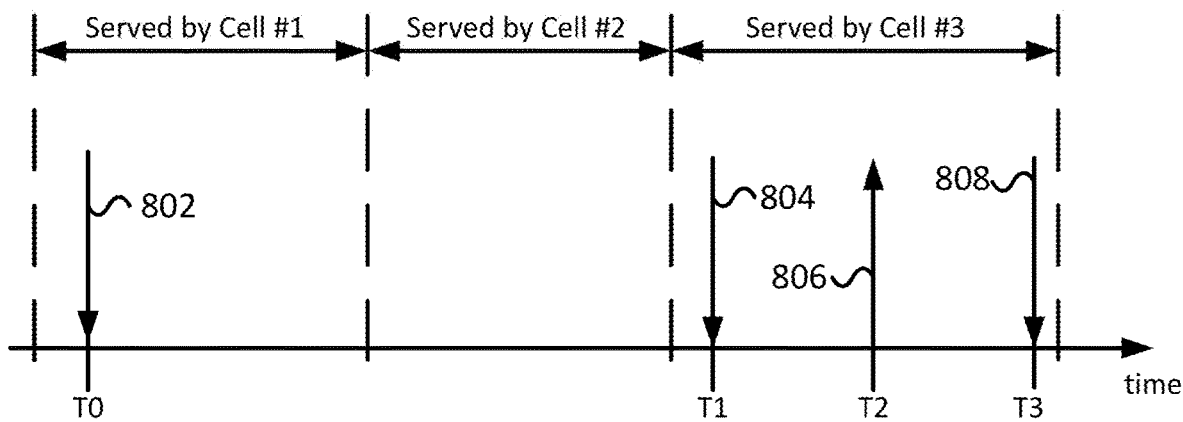
FIG. 8 is a diagram illustrating a Vehicle to Everything (V2X)-System Information (SI) enquiry procedure according to an example implementation of the present disclosure.

FIG. 8 is a diagram 800 illustrating a V2X-SI enquiry procedure according to an example implementation of the present disclosure. At time T0, the UE may be served by cell #1 and the UE may receive a V2X-SI that includes an area-based Exceptional Resource Pool configuration in action 802. In this example the area-based Exceptional Resource Pool configuration has a validity area of {Cell #1, Cell #2, Cell #3}. Therefore, the area-based Exceptional Resource Pool configuration may remain valid to the UE while the UE is moving from Cell #1 to Cell #2 to Cell #3 sequentially.

At time T1, the UE may have moved to the coverage of Cell #3 and thus Cell #3 becomes the serving cell to the UE.

In action 804, the UE may successfully receive SIB1 from Cell #3 at time T1. The SIB1 may be broadcast from Cell #3. In this example Cell #3 does not broadcast V2X-SI continuously. Instead, Cell #3 transmits V2X-SI only when requested (by UE). For example, Cell #3 may broadcast V2X-SI after an on-demand SI request procedure initiated by the UE. The UE may need to request V2X-SI through a random access (RA) procedure.

At time T2, the UE may start the on-demand SI request procedure by sending a preamble in action 806. The UE may transmit a SI request message in MSG3 or MSG5 to Cell#3 (not illustrated in FIG. 8). At time T3, Cell #3 may start broadcasting V2X-SI in action 808 after receiving the SI request message from the UE.

It should be noted that for an RRC inactive or RRC idle UE served by Cell#3, the UE may not have valid sidelink resource for sidelink packet delivery before receiving the V2X-SI successfully at T3. However, in the example illustrated in FIG. 8, the (area-based) Exceptional Resource Pool configuration that the UE receives from Cell #1 may still be valid when the UE is served by Cell #3. In one implementation, the UE may still access valid Exceptional Resource Pool (based on the stored Exceptional Resource Pool configuration) during the on-demand SI request procedure if the UE does not have other valid sidelink resource (e.g., sidelink resource pool configuration, sidelink configured grant, or dedicated sidelink resource) during the on-demand SI request procedure. In some other implementations, the UE may not initiate the on-demand SI request procedure if the stored V2X-SI is still valid.

As described previously, in some conditions, the UE may be allowed to access the Exceptional Resource Pool (based on the stored Exceptional Resource Pool configuration) from time T1 (the UE receives SIB1 successfully and V2X-SI is not immediately available) to time T3 (the UE receives V2X-SI successfully). In some other conditions, the UE may be allowed to access the Exceptional Resource Pool (based on the stored Exceptional Resource Pool configuration) from time T2 (the UE starts V2X-SI request procedure by sending one preamble to the Cell #3) to time T3. In other words, because the UE may store sidelink resource configuration in advance and apply the stored sidelink resource configuration as long as the requirement for the validity area is fulfilled, the UE may perform sidelink transmission in Cell #3 before receiving V2X-SI from Cell #3.

In one implementation, the UE may also access the Exceptional Resource Pool configuration even if the V2X-SI is already broadcast by Cell #3 continuously (but the V2X-SI is not immediately available to the UE based on the received scheduling information). For example, the UE may receive SIB1 successfully at time T1'. The UE may know that V2X-SI is scheduled by Cell #3 but V2X-SI would not be transmitted by the Cell #3 immediately. The UE may also know that V2X-SI would be scheduled and transmitted by Cell #3 later. In this condition, the UE may start to monitor and try to decode the V2X-SI based on the scheduling information that the UE receives by decoding the SIB1. Assume the UE may receive the V2X-SI from Cell #3 successfully at time T4. In one implementation, the UE may also be allowed to access the received area-based Exceptional Resource Pool (based on the stored Exceptional Resource Pool configuration) from time T1' to T4.

In one implementation, the UE may also be configured with an area-specific 'normal' Resource Pool configuration. In general, the UE accesses the normal Resource Pool except the configured exceptional case occurs. Examples of the exceptional cases are provided in Table 1. In this example, assume Cell #3 is also included in one (or more than one) validity area of normal Resource Pool(s). That is, Cell #3 may be included in the validity area of (at least) one 'normal' Resource Pool and (at least) one 'Exceptional' Resource Pool. In this condition, the UE may just be allowed to access the normal Resource Pool, rather than the Exceptional Resource Pool, during the time period from T1' to T4. In other words, the normal Resource Pool has higher priority than the Exceptional Resource Pool from T1' to T4.

In one implementation, every cell that supports (LTE/NR) V2X service or NR sidelink service may be configured to broadcast V2X-SI continuously. In other words, a cell that supports (LTE/NR) V2X service/NR sidelink service may not be configured to deliver V2X-SI through an on-demand SI request procedure. However, in this approach, the UE may obtain the V2X-SI several hundred milliseconds after receiving the SI scheduling information indicated in the SIB1. For example, the UE may receive the SIB1 that indicates the SI scheduling information of V2X-SI at T1''. After the UE receives the SIB1, the UE may monitor the V2X-SI based on the given SI scheduling information. Then, the UE may successfully receive the V2X-SI at T4''. In one implementation, the UE may still access the valid (area-based) Exceptional Resource Pool during from time T1'' to T4''. It should be noted that the implementations in Case #4-1 may be applicable to an inter-RAT/intra-RAT scenario.

Case #4-2: RRC Resume Procedure

Figure 9A:
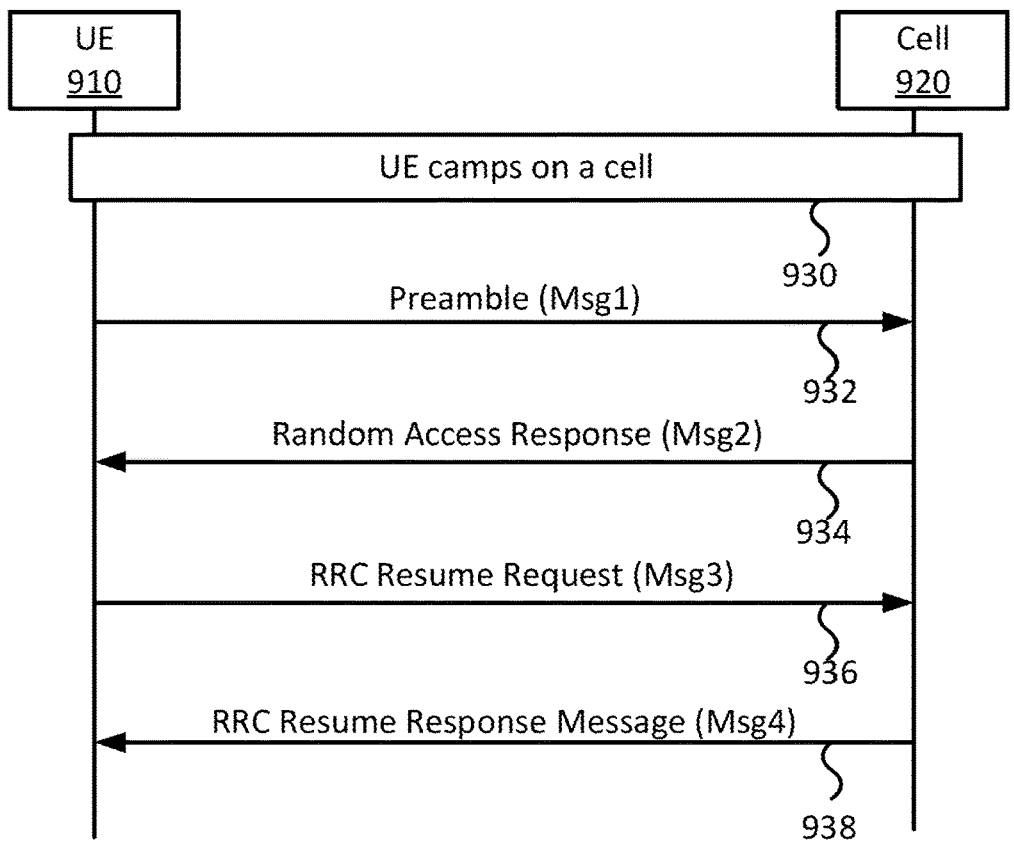
FIG. 9A is a diagram illustrating a radio resource control (RRC) Resume procedure through a 4-step random access (RA) procedure according to an example implementation of the present disclosure.

In one implementation, an RRC inactive/RRC idle UE may also be allowed to access the (area-based) Exceptional Resource Pool (based on the stored Exceptional Resource Pool configuration) while the UE is performing an RRC Resume procedure. FIG. 9A is a diagram 900A illustrating an RRC Resume procedure through a 4-step RA procedure according to an example implementation of the present disclosure. In action 930, UE 910 camps on a serving Cell 920. Then, the UE 910 may start an RRC Resume Request procedure with the Cell 920 (for V2X service support from the serving Cell 920). In action 932, the UE 910 transmits a preamble (also known as Msg1 in the 4-step RA procedure). In action 934, the Cell 920 may reply a random access response (Msg2 in the 4-step RA procedure), which may include UL timing advance instruction and/or UL grant, to the UE 910. In action 936, after receiving Msg2 successfully, the UE may transmit an RRC Resume Request message (Msg3 in the 4-step RA procedure) to request to resume the RRC Connection to the serving RAN. In action 938, after receiving the RRC Resume Request message (e.g., RRCResumeRequest), the Cell 920 may reply an RRC Resume Response message (Msg4 in the 4-step RA procedure) to the UE 910. Based on New Radio Protocols, the RRC Resume Response message may be RRCSetup message, RRCResume message, RRCRelease message (with or without suspend configuration), and RRCReject message.

In one implementation, the UE 910 may be allowed to access the (area-based) Exceptional Resource Pool(s) between action 932 (UE is initiating the RRC Resume procedure by sending Msg1) and action 938 (UE receives the RRC Resume Response message (Msg4) successfully). In another implementation, the UE 910 may be allowed to access the (area-based) Exceptional Resource Pool(s) while the UE 910 is triggered by upper layers (e.g., V2X layer) to initiate an NR sidelink service/LTE V2X service until action 938 (UE receives the RRC Resume Response message (Msg4) successfully) is done.

Figure 9B:
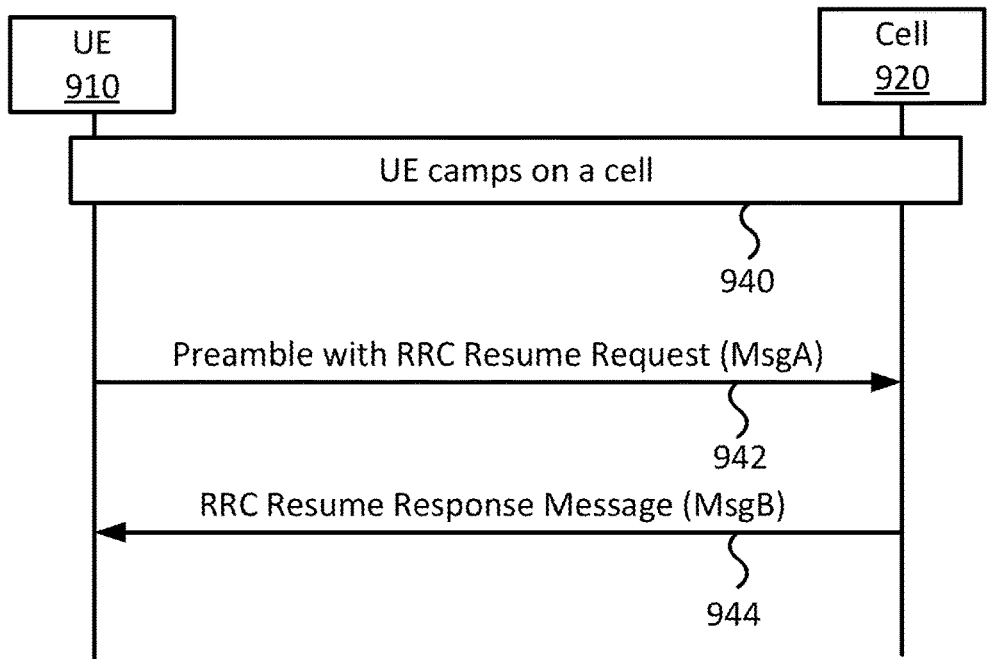
FIG. 9B is a diagram illustrating an RRC Resume procedure through a 2-step RA procedure according to an example implementation of the present disclosure.

In one implementation, the RRC Resume procedure may be implemented through a 2-step RA procedure. FIG. 9B is a diagram illustrating an RRC Resume procedure through a 2-step RA procedure according to an example implementation of the present disclosure. In action 940, UE 910 camps on a serving Cell 920. In action 942, the UE 910 may transmit an RRC Resume Request message (with one selected preamble) as MsgA to the Cell 920. In action 944, the Cell 920 may reply with an RRC Resume Response message as MsgB to the UE 910.

In one implementation, the UE 910 may be allowed to access the (area-based) Exceptional Resource Pool(s) (based on the stored Exceptional Resource Pool configuration) between action 942 and action 944. In another implementation, the UE 910 may be allowed to access the (area-based) Exceptional Resource Pool(s) while the UE 910 is triggered by upper layers (e.g., V2X layer) to initiate an NR sidelink service/LTE V2X service until action 944 (UE receives the RRC Resume Response message (Msg4) successfully) is done.

In one implementation, the UE may be configured with a timer (e.g., T319 described in the 3GPP TS) for the RRC Resume procedure. For example, the UE may start T319 upon transmission of RRCResumeRequest (or RRCResumeRequest1 in some implementations in NR protocols) to the serving Cell. The UE may stop T319 upon the following events: reception of RRCResume, RRCSetup, RRCRelease (with/without suspendConfig) or RRCReject message, cell re-selection and upon abortion of connection establishment by upper layers, or T319 expiry. In one implementation, the UE may be allowed to access the valid (area-based) Exceptional Resource Pool(s) (based on the stored Exceptional Resource Pool configuration) while T319 is running. It should be noted that the implementation may be applicable to both the 2-step RA procedure and the 4-step RA procedure.

Figure 10:
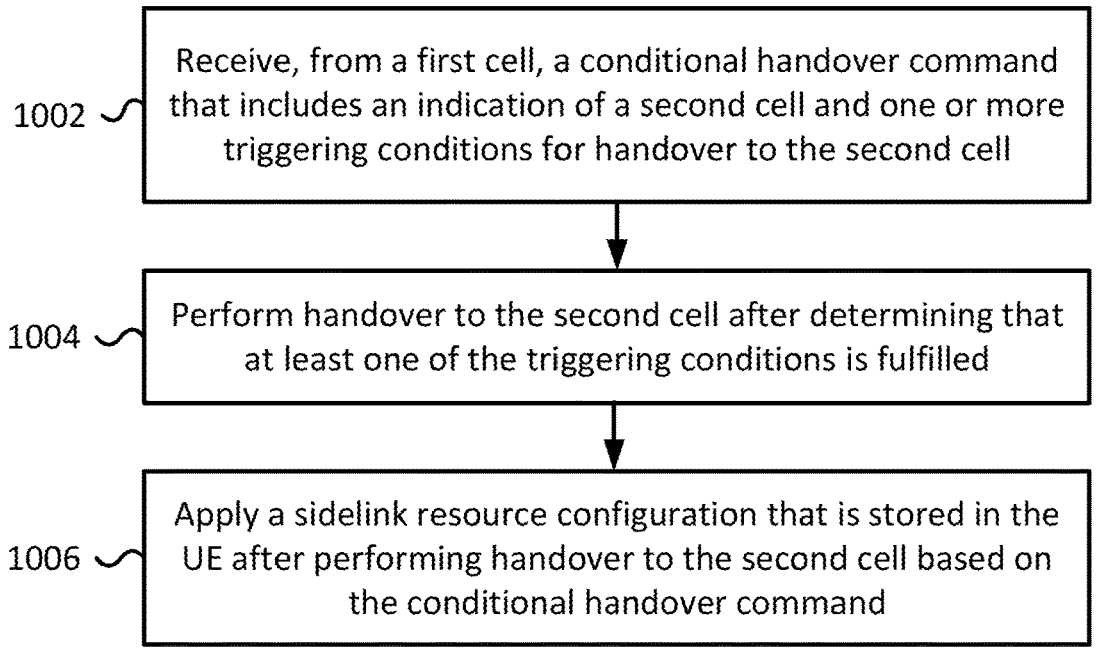
FIG. 10 is a flowchart of a method performed by a UE for sidelink operation according to an example implementation of the present disclosure.

FIG. 10 is a flowchart of a method 1000 performed by a UE for sidelink operation according to an example implementation of the present disclosure. In action 1002, the UE may receive, from a first cell, a conditional handover command that includes an indication of a second cell and one or more triggering conditions for handover to the second cell. In one implementation, the conditional handover command may include indications of other cells in addition to the second cell and triggering conditions for handover to the other cells. Description about the conditional handover command may be referred to FIG. 1. For example, the first cell in action 1002 may be associated with the source BS 104 in FIG. 1, and the second cell in action 1002 may be associated with one of the target BS 106 #1 and the target BS #2 108 in FIG. 1.

In action 1004, the UE may perform handover to the second cell after determining that at least one of the triggering conditions (e.g., Event A3/A5 or other triggering events, such as A1, A2, A4) is fulfilled. In action 1006, the UE may apply a sidelink resource configuration that is stored in the UE after performing handover to the second cell based on the conditional handover command. Therefore, the UE may be able to perform sidelink transmission in the second cell without obtaining a sidelink resource configuration from the second cell, effectively reducing transmission latency.

In one implementation, the sidelink resource configuration may be included in the conditional handover command. The UE may store the sidelink resource configuration after receiving the conditional handover command. In addition, each target cell may be associated with one sidelink resource configuration. Therefore, after the UE selects one target cell (through the indicated candidate target cells) for handover, the UE may start to access the sidelink resource configuration associated with the selected target cell.

In one implementation, the sidelink resource configuration stored in the UE may be obtained from the first cell. For example, the first cell and the second cell may belong to a same validity area. The UE may apply the sidelink resource configuration that is obtained from the first cell for sidelink packet transmission in the second cell. In one implementation, the sidelink resource configuration stored in the UE may be obtained from a cell that shares same area information with the second cell. One example method is illustrated in FIG. 11.

Figure 11:
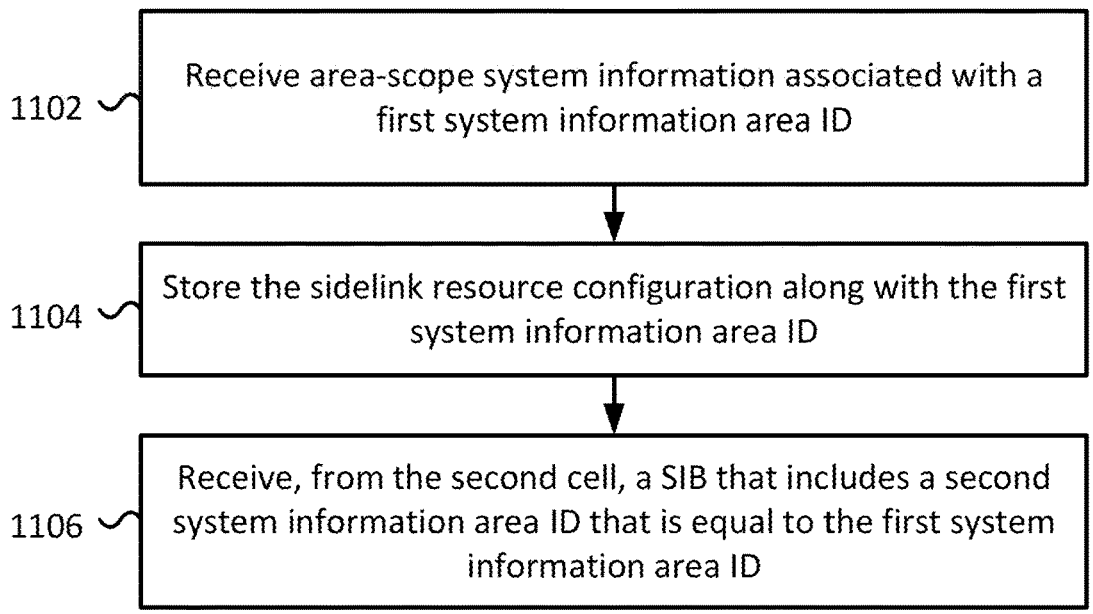
FIG. 11 is a flowchart of a method performed by a UE for applying area-specific sidelink resource configuration according to an example implementation of the present disclosure.

FIG. 11 is a flowchart of a method 1100 performed by a UE for applying area-specific sidelink resource configuration according to an example implementation of the present disclosure. In action 1102, the UE may receive area-scope system information associated with a first system information area ID. In one implementation, the UE may receive the area-scope system information (e.g., area-specific sideilnk resource configuration) from the first cell or a previous serving cell other than the first cell. In one implementation, the area-scope system information may represent system information that is commonly shared in specific area. Implementations about the area-scope system information may be referred to the validity area introduced in Table 2. For example, the area-scope system information may be an exceptional resource pool, a normal resource pool, a sidelink resource configuration, or other V2X related configurations. The first system information area ID may be a systeminformationAreaID, PLMN identity, Cellidentity, RANAC, TAC, etc.

In action 1104, the UE may store the sidelink resource configuration along with the first system information area ID. Therefore, the sidelink resource configuration is associated with the first system information area ID in the UE. When the UE later identifies the first system information area ID from a new cell (e.g., a target cell for handover), the UE may apply the stored sidelink resource configuration.

In action 1106, the UE may receive, from the second cell, a SIB (e.g., a V2X-SI that the UE needs to configure one NR sidelink service/LTE V2X service) that includes a second system information area ID that is equal to the first system information area ID. In one implementation, the SIB may be broadcast by the second cell. In one implementation, the SIB may be system information block type 1 (SIB1). Based on the second system information area ID in the SIB, the UE recognizes that the second cell belongs to a validity area associated with the stored sidelink resource configuration. Therefore, the UE may apply the stored sidelink resource configuration in the second cell. Otherwise, in some additional implementations, the UE may release the stored sidelink resource configuration and enquire V2X-SI from the second cell.

In one implementation, a sidelink resource configuration may include a CBR measurement configuration. In action 1104, the UE may receive a CBR measurement configuration associated with the sidelink resource configuration. After identifying that the second cell belongs to a validity area associated with the stored sidelink resource configuration in action 1106, the UE may apply the CBR measurement configuration after performing handover to the second cell (e.g., based on conventional handover procedure or conditional handover procedure). Therefore, the UE may be able to perform CBR measurement in the second cell without obtaining a new CBR measurement configuration from the second cell, effectively reducing latency for CBR measurement. In some additional implementations, a CBR measurement procedure (and the CBR values stored in the UE side to be associated with the CBR measurement procedure), which is initiated before the (conditional) handover procedure, may still be continued after the (conditional) handover procedure is triggered if the CBR measurement configuration and the target (Exceptional) sidelink resource pool configuration (for CBR measurement) are not modified by the (conditional) handover procedure. Please also note that the proposed mechanisms may also be applicable to other sidelink measurements (e.g., the channel occupancy measurement and SL-RSRP/SL-RSRQ/SL-RS SI/SL-SINR measurements).

Figure 12:
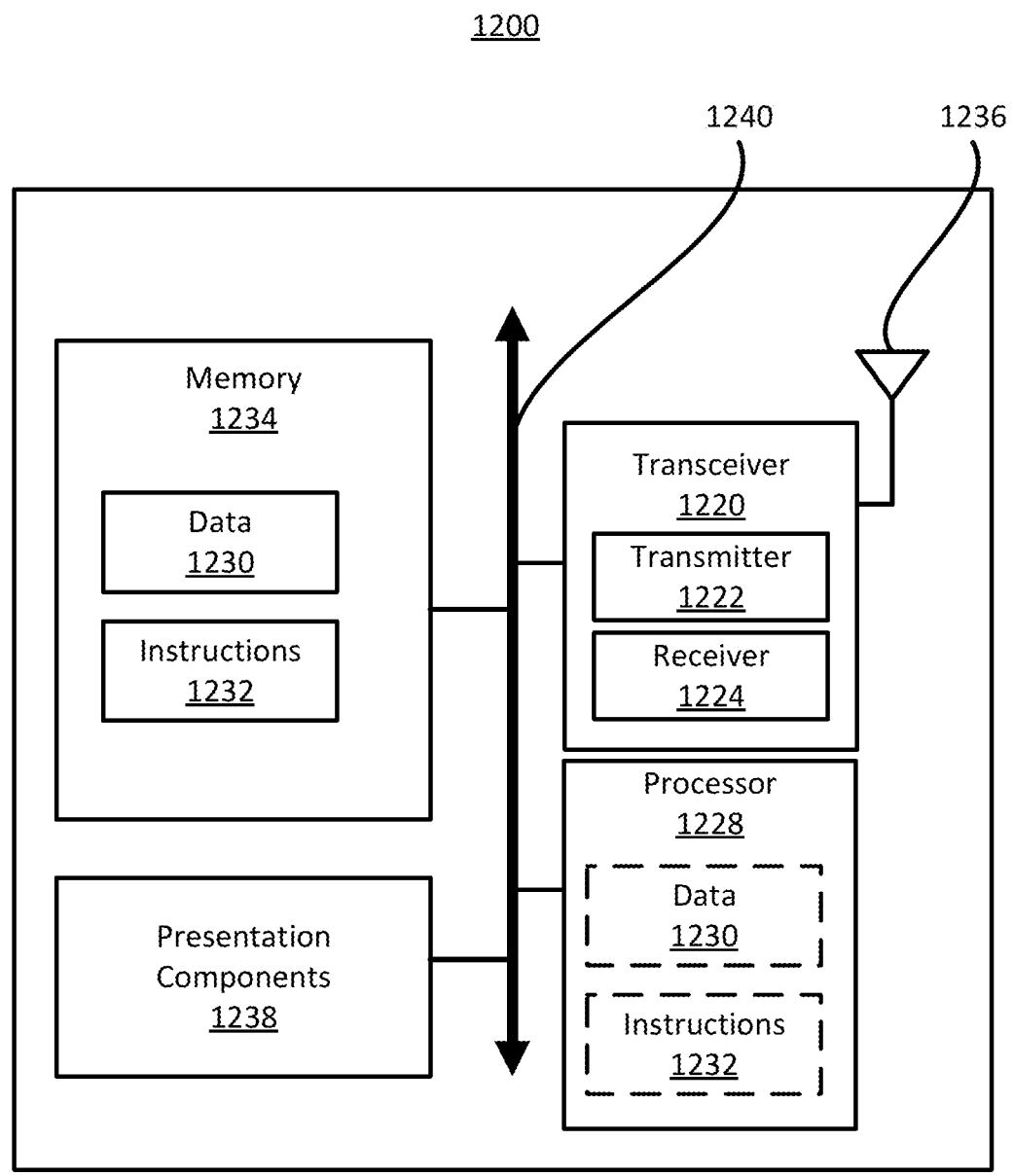
FIG. 12 is a block diagram illustrating a node for wireless communication in accordance with various aspects of the present disclosure.

FIG. 12 is a block diagram illustrating a node 1200 for wireless communication according to the present disclosure. As illustrated in FIG. 12, a node 1200 may include a transceiver 1220, a processor 1228, a memory 1234, one or more presentation components 1238, and at least one antenna 1236. The node 1200 may also include a Radio Frequency (RF) spectrum band module, a BS communications module, a network communications module, and a system communications management module, Input/Output (I/O) ports, I/O components, and a power supply (not illustrated in FIG. 12).

Each of the components may directly or indirectly communicate with each other over one or more buses 1240. The node 1200 may be a UE or a BS that performs various functions disclosed with reference to FIGS. 1 through 11.

The transceiver 1220 has a transmitter 1222 (e.g., transmitting/transmission circuitry) and a receiver 1224 (e.g., receiving/reception circuitry) and may be configured to transmit and/or receive time and/or frequency resource partitioning information. The transceiver 1220 may be configured to transmit in different types of subframes and slots including but not limited to usable, non-usable and flexibly usable subframes and slot formats. The transceiver 1220 may be configured to receive data and control channels.

The node 1200 may include a variety of computer-readable media. Computer-readable media may be any available media that may be accessed by the node 1200 and include both volatile and non-volatile media, removable and non-removable media.

The computer-readable media may include computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not include a propagated data signal. Communication media typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the previously listed components should also be included within the scope of computer-readable media.

The memory 1234 may include computer-storage media in the form of volatile and/or non-volatile memory. The memory 1234 may be removable, non-removable, or a combination thereof. Example memory includes solid-state memory, hard drives, optical-disc drives, etc. As illustrated in FIG. 12, the memory 1234 may store computer-readable, computer-executable instructions 1232 (e.g., software codes) that are configured to cause the processor 1228 to perform various functions disclosed herein, for example, with reference to FIGS. 1 through 11. Alternatively, the instructions 1232 may not be directly executable by the processor 1228 but be configured to cause the node 1200 (e.g., when compiled and executed) to perform various functions disclosed herein.

The processor 1228 (e.g., having processing circuitry) may include an intelligent hardware device, e.g., a Central Processing Unit (CPU), a microcontroller, an ASIC, etc. The processor 1228 may include memory. The processor 1228 may process data 1230 and the instructions 1232 received from the memory 1234, and information transmitted and received via the transceiver 1220, the base band communications module, and/or the network communications module. The processor 1228 may also process information to be sent to the transceiver 1220 for transmission via the antenna 1236 to the network communications module for transmission to a core network.

One or more presentation components 1238 present data indications to a person or another device. Examples of presentation components 1238 include a display device, a speaker, a printing component, and a vibrating component, etc.

In view of the present disclosure, it is obvious that various techniques may be used for implementing the concepts in the present disclosure without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE) comprising:
one or more non-transitory computer-readable media containing computer-executable instructions embodied therein; and
at least one processor coupled to the one or more non-transitory computer-readable media, the at least one processor configured to execute the computer-executable instructions to:
receive, from a first cell, a conditional handover command that includes an indication of a second cell and one or more triggering conditions for handover to the second cell;
perform handover to the second cell after determining that at least one of the triggering conditions is fulfilled; and
apply a sidelink resource configuration that is stored in the UE after performing handover to the second cell based on the conditional handover command, the sidelink resource configuration having an associated Channel Busy Ratio (CBR) measurement configuration; and
apply the CBR measurement configuration after performing handover to the second cell.

2. The UE of claim 1, wherein the sidelink resource configuration is included in the conditional handover command.

3. The UE of claim 1, wherein the at least one processor is further configured to execute the computer-executable instructions to:
receive area-scope system information associated with a first system information area identifier (ID);
store the sidelink resource configuration along with the first system information area ID; and
receive, from the second cell, a system information block (SIB) that includes a second system information area ID that is equal to the first system information area ID.

4. The UE of claim 3, wherein the at least one processor is further configured to execute the computer-executable instructions to:
transmit a system information request message through UE-specific unicast control signaling to the first cell, wherein the area-scope system information is received from the first cell after the transmission of the system information request message.

5. The UE of claim 4, wherein the area-scope system information is received from the first cell through UE-specific unicast control signaling.

6. The UE of claim 3, wherein the area-scope system information is divided into at least two segments.

7. The UE of claim 1, wherein the sidelink resource configuration includes a normal sidelink resource pool configuration and an exceptional sidelink resource pool configuration, and the at least one processor is further configured to execute the computer-executable instructions to:
apply the exceptional sidelink resource pool configuration during the handover procedure to the second cell.

8. The UE of claim 7, wherein each of the normal sidelink resource pool configuration and the exceptional sidelink resource pool configuration is associated with one sidelink bandwidth part (BWP) in one sidelink component carrier, wherein the UE applies the sidelink resource pool configuration associated with one or more sidelink component carriers when performing handover to the second cell based on the conditional handover command.

9. The UE of claim 1, wherein the at least one processor is further configured to execute the computer-executable instructions to:
apply the sidelink resource configuration during a radio resource control (RRC) re-establishment procedure with the second cell.

10. The UE of claim 1, wherein the at least one processor is further configured to execute the computer-executable instructions to:
apply the sidelink resource configuration after determining that at least one of the triggering conditions is fulfilled and radio link failure occurs.

11. The UE of claim 1, wherein the at least one processor is further configured to execute the computer-executable instructions to:
apply the sidelink resource configuration after the UE moves to a radio resource control (RRC) inactive state or an RRC idle state.

12. The UE of claim 1, wherein the sidelink resource configuration includes at least one of a resource configuration for New Radio (NR) sidelink operation and a resource configuration for Long Term Evolution (LTE) Vehicle-to-Everything (V2X) service.

13. A method for sidelink operation performed by a user equipment (UE), the method comprising:
receiving, from a first cell, a conditional handover command that includes an indication of a second cell and one or more triggering conditions for handover to the second cell;
performing handover to the second cell after determining that at least one of the triggering conditions is fulfilled; and
applying a sidelink resource configuration that is stored in the UE after performing handover to the second cell based on the conditional handover command, the sidelink resource configuration having an associated Channel Busy Ratio (CBR) measurement configuration; and
applying the CBR measurement configuration after performing handover to the second cell.

14. The method of claim 13, wherein the sidelink resource configuration is included in the conditional handover command.

15. The method of claim 13, further comprising:
receiving area-scope system information associated with a first system information area identifier (ID);
storing the sidelink resource configuration along with the first system information area ID; and
receiving, from the second cell, a system information block (SIB) that includes a second system information area ID that is equal to the first system information area ID.

16. The method of claim 15, further comprising:
transmitting a system information request message through UE-specific unicast control signaling to the first cell, wherein the area-scope system information is received from the first cell after the transmission of the system information request message.

17. The method of claim 16, wherein the area-scope system information is received from the first cell through UE-specific unicast control signaling.

18. The method of claim 15, wherein the area-scope system information is divided into at least two segments.

19. The method of claim 13, wherein the sidelink resource configuration includes a normal sidelink resource pool configuration and an exceptional sidelink resource pool configuration, and the method further comprises:
applying the exceptional sidelink resource pool configuration during the handover procedure to the second cell.

20. The method of claim 19, wherein each of the normal sidelink resource pool configuration and the exceptional sidelink resource pool configuration is associated with one sidelink bandwidth part (BWP) in one sidelink component carrier, wherein the UE applies the sidelink resource pool configuration associated with one or more sidelink component carriers when performing handover to the second cell based on the conditional handover command.

21. The method of claim 13, further comprising:
applying the sidelink resource configuration during a radio resource control (RRC) re-establishment procedure with the second cell.

22. The method of claim 13, further comprising:
applying the sidelink resource configuration after determining that at least one of the triggering conditions is fulfilled and radio link failure occurs.

23. The method of claim 13, further comprising:
applying the sidelink resource configuration after the UE moves to a radio resource control (RRC) inactive state or an RRC idle state.

24. The method of claim 13, wherein the sidelink resource configuration includes at least one of a resource configuration for New Radio (NR) sidelink operation and a resource configuration for Long Term Evolution (LTE) Vehicle-to-Everything (V2X) service.

\* \* \* \* \*